United States Patent

Nonoshita et al.

[11] Patent Number: 5,905,821
[45] Date of Patent: May 18, 1999

[54] COMPRESSION/EXPANSION CIRCUIT HAVING TRANSFER MEANS AND STORAGE MEANS WITH ADDRESS MANAGEMENT OF THE STORAGE MEANS

[75] Inventors: Hiroshi Nonoshita, Fujisawa; Yasuhisa Ishizawa, Hachioji, both of Japan

[73] Assignee: Canon Kabushiki Kaisha, Tokyo, Japan

[21] Appl. No.: 08/352,429

[22] Filed: Dec. 8, 1994

Related U.S. Application Data

[63] Continuation of application No. 08/021,576, Feb. 24, 1993, abandoned.

[30] Foreign Application Priority Data

Feb. 28, 1992 [JP] Japan ..................................... 4-043883

[51] Int. Cl.⁶ ........................................................ G06K 9/32
[52] U.S. Cl. ................................... 382/299; 382/233
[58] Field of Search ................................. 382/166, 232, 382/234, 235, 233, 244–248, 299, 307, 305; 348/400, 408, 390; 358/260, 450; 345/127, 202; 341/131

[56] References Cited

U.S. PATENT DOCUMENTS

| | | | |
|---|---|---|---|
| 4,571,633 | 2/1986 | Kondo | 382/56 |
| 4,675,908 | 6/1987 | Saito et al. | 382/41 |
| 4,734,786 | 3/1988 | Minakawa et al. | 358/287 |
| 4,741,047 | 4/1988 | Sharpe II | 382/306 |
| 4,764,975 | 8/1988 | Inoue | 382/299 |
| 4,843,632 | 6/1989 | Lee et al. | 382/233 |
| 4,868,764 | 9/1989 | Richards | 364/518 |
| 4,870,497 | 9/1989 | Chamzas et al. | 358/426 |
| 4,918,527 | 4/1990 | Penard et al. | 358/133 |
| 4,999,715 | 3/1991 | Porcellio et al. | 358/261.4 |
| 5,008,951 | 4/1991 | Koshi | 382/245 |
| 5,033,106 | 7/1991 | Kita | 382/56 |
| 5,081,450 | 1/1992 | Lucas et al. | 345/202 |
| 5,097,518 | 3/1992 | Scott et al. | 382/47 |
| 5,231,679 | 7/1993 | Matsuura et al. | 382/47 |
| 5,237,316 | 8/1993 | Cox, Jr. et al. | 345/149 |
| 5,438,635 | 8/1995 | Richards | 382/232 |
| 5,463,700 | 10/1995 | Nakazawa | 382/232 |

FOREIGN PATENT DOCUMENTS

| | | | |
|---|---|---|---|
| 86 05055 | 8/1986 | WIPO | H04N 1/00 |
| 88 10477 | 12/1988 | WIPO | G06K 15/02 |

*Primary Examiner*—Jon Chang
*Assistant Examiner*—Jayanti K. Patel
*Attorney, Agent, or Firm*—Fitzpatrick, Cella, Harper & Scinto

[57] ABSTRACT

A compressing/expanding circuit for compressing and expanding image data by a JBIG method comprises a memory medium such as floppy disk or hard disc to store the image data, a compressing circuit to compress the data, an expanding circuit to expand the data, a transfer circuit to transfer the data stored in the memory medium to the compressing circuit or expanding circuit, a storage controller to store the data compressed by the compressing circuit or the data expanded by the expanding circuit to the memory medium, a compression controller to control the transfer circuits compressing circuit, and storage controller so as to repetitively operate, an expansion controller to control the transfer circuit, expanding circuit, and storage controller so as to repetitively operate, and a designating circuit to designate either one of the compressing process and the expanding process. In the case where the compressing process is designated by the designating circuit, the transfer circuit, compressing circuit, and storage controller are controlled by the compression controller. In the case where the expanding process is designated by the designating circuit, the transfer circuit, expanding circuit, and storage controller are controlled by the expansion controller.

21 Claims, 20 Drawing Sheets

PIXEL REQUIRED IN REDUCTION AND ENCODER

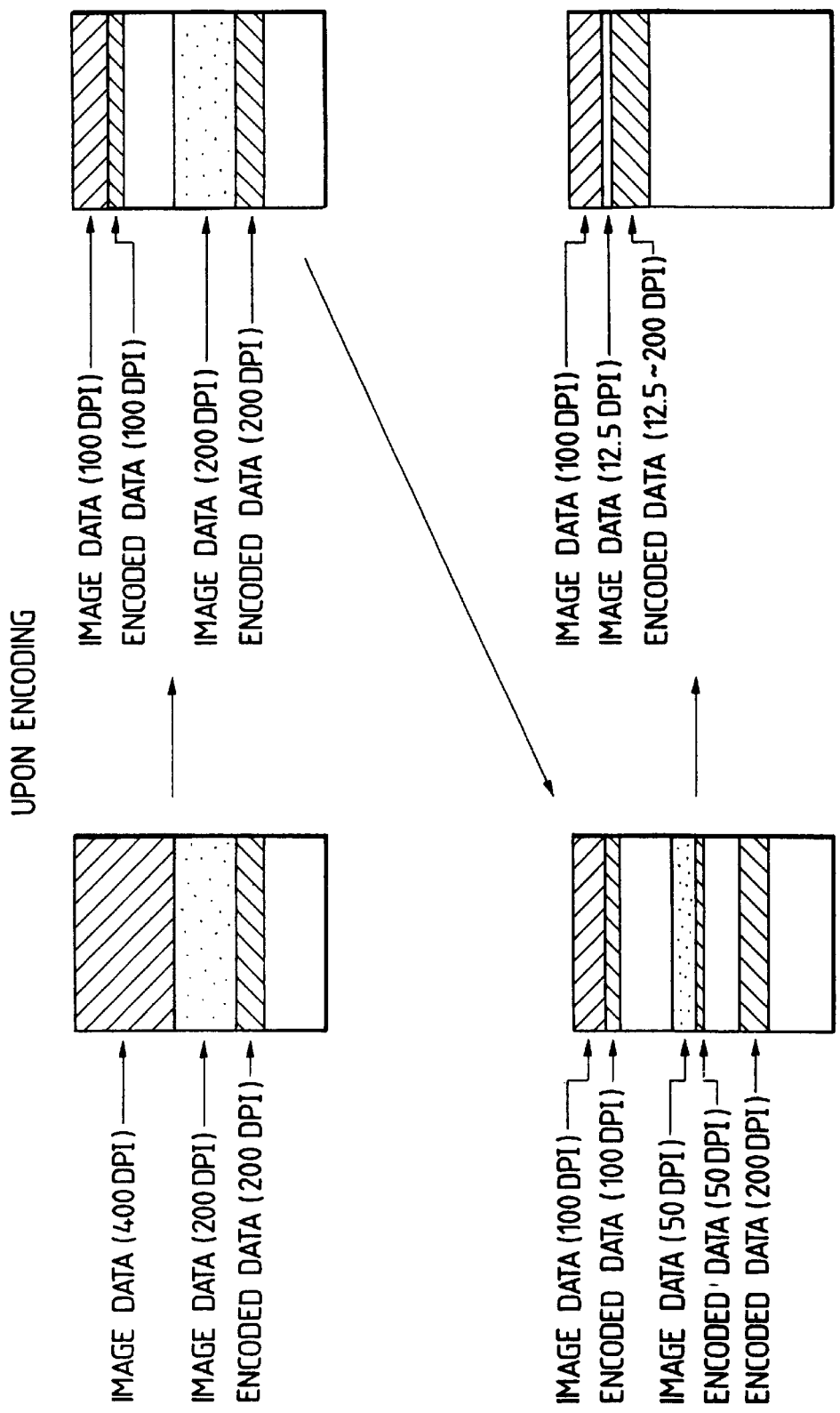

COMPRESSION/EXPANSION CIRCUIT HAVING TRANSFER MEANS AND STORAGE MEANS WITH ADDRESS MANAGEMENT OF THE STORAGE MEANS

This application is a continuation of application Ser. No. 08/021,576 filed Feb. 24, 1993, now abandoned.

BACKGROUND OF THE INVENTION

1. Field of the Invention

The present invention relates to a compression/expansion circuit to perform compression or expansion of image data by a JBIG method.

2. Related Background Art

Several methods are proposed as methods of compression or expanding image data. Among them, the compressing/expanding method called a JBIG method is a compressing/expanding method in which a standardizing work is being progressed by a JBIG (Joint Bi-level Image Group) separated from a JPEG (Joint Photographic Experts Group).

The above method has been disclosed in detail in the magazine of The Society of Japan Image Electronics, Vol. 20, No. 1, pages 41 to 49, 1990. The compressing/expanding method of the JBIG method will now be briefly explained.

In case of compressing image data of (4×4) pixels as shown in FIG. 21, for instance, image data $A_1$ to $A_{16}$ of (4×4) pixels of, e g., 400 dpi are compressed into image data $B_1$ to $B_4$ of 200 dpi. Differences between the compressed image data $B_1$ to $B_4$, and the original image data $A_1$ to $A_{16}$, are encoded. The compressed image data are newly set to image data $A_1$ to $A_{16}$ as targets to be compressed and the compressing and encoding processes are again executed.

As mentioned above, the original image data is compressed into the image data of the lowest resolution of about 12.5 dpi. The image data of the lowest resolution is used together with the encoded data for communication, preservation or storage. On the other hand, in case of expanding the image data of the lowest resolution, the image data of a resolution (25 dpi), which is higher by one rank, is formed by using the image data of the lowest resolution (12.5 dpi), and its encoded data. In a manner similar to that described above, by sequentially forming the image data of a higher resolution, the image data of the low resolution is expanded to the original image data of 400 dpi.

According to the JBIG method, when compressed image data is formed, namely, in the example of FIG. 21 in case of forming the compressed image data at the pixel position of $B_4$, the high resolution image data at the pixel positions $A_6$ to $A_8$, $A_{10}$ to $A_{12}$, and $A_{14}$ to $A_{16}$ in a region surrounded by a bold line in FIG. 21 and the image data of $B_1$ to $B_3$ which have already been compressed are substituted into a weighting arithmetic operating expression and the compressed image data at the pixel position of $B_4$ is determined.

Although the image data at a reference pixel position is also used as data which is used in the encoding, the reference pixel positions near the position of a target pixel to be encoded and the number of reference pixel positions can be variably set in accordance with the contents of the image data at the pixel positions.

FIG. 22 shows a circuit to compress the image data of 400 dpi into the image data of 12.5 dpi by using such an algorithm as mentioned above.

In FIG. 22, the image data of one picture plane of 400 dpi, which has been stored in a frame memory 118, is compressed into the image data of 200 dpi by a reduction circuit 119 on the basis of the foregoing arithmetic operating method. The compressed image data of 200 dpi is temporarily stored into a frame memory 120. After that, the image data of the lowest resolution is formed in a multistage manner by a plurality of reduction circuits 121 and frame memories 122.

An encoder 125 performs an encoding for 200 dpi by using image data of 400 dpi and the image data of 200 dpi after it was compressed. An encoder 124 executes the encoding for 100 dpi by using image data of 200 dpi and image data of 100 dpi. In a manner similar to the above, encoded data corresponding to the compressed image data is formed by an encoder (not shown) every stage.

In case of expansions the image data of the lowest resolution and the encoded data which have been stored in the frame memories are supplied to an expansion device and the image data of a resolution which is higher by one rank is decoded by a processing procedure opposite to the above. Subsequently, the image data of a resolution which is higher by one rank is formed at multistage by using the image data and the encoded data.

In the compression/expansion circuit of the JBIG method, it is necessary to execute the compressing and/or expanding processes in a multistage (hierarchy) manner, so that the compression/expansion circuits need to be serially connected. There are, consequently, drawbacks such that the number of parts is large and a circuit construction is complicated and the apparatus is very expensive.

SUMMARY OF THE INVENTION

It is, therefore, an object of the present invention to provide a compression/expansion circuit in which the number of component parts is reduced and a circuit construction is simplified in consideration of the above drawbacks.

To accomplish the above object, according to the present invention, there is provided a compression/expansion circuit for executing a modifying process of either one of the compression and/or expansion of image data in a multistage manner by the JBIG method, wherein the compression/expansion circuit comprises: a signal processing circuit to execute the modifying process of one stage; memory means; writing means for writing image data which has been modified by the signal processing circuit into the memory means; reading means for reading out the image data written in the memory means as a target to be subjected to the modifying process at the next stage and for supplying the read-out image data to the signal processing circuit, and wherein the writing process of the writing means and the reading process of the reading means are repetitively executed only a predetermined number of times, thereby performing the modifying process in a multistage manner.

BRIEF DESCRIPTION OF THE DRAWINGS

FIG. 20 is an explanatory diagram showing an example of data storage according to another embodiment;

DETAILED DESCRIPTION OF THE PREFERRED EMBODIMENTS

Embodiments of the present invention will now be described in detail hereinbelow with reference to the drawings.

Figure 2:
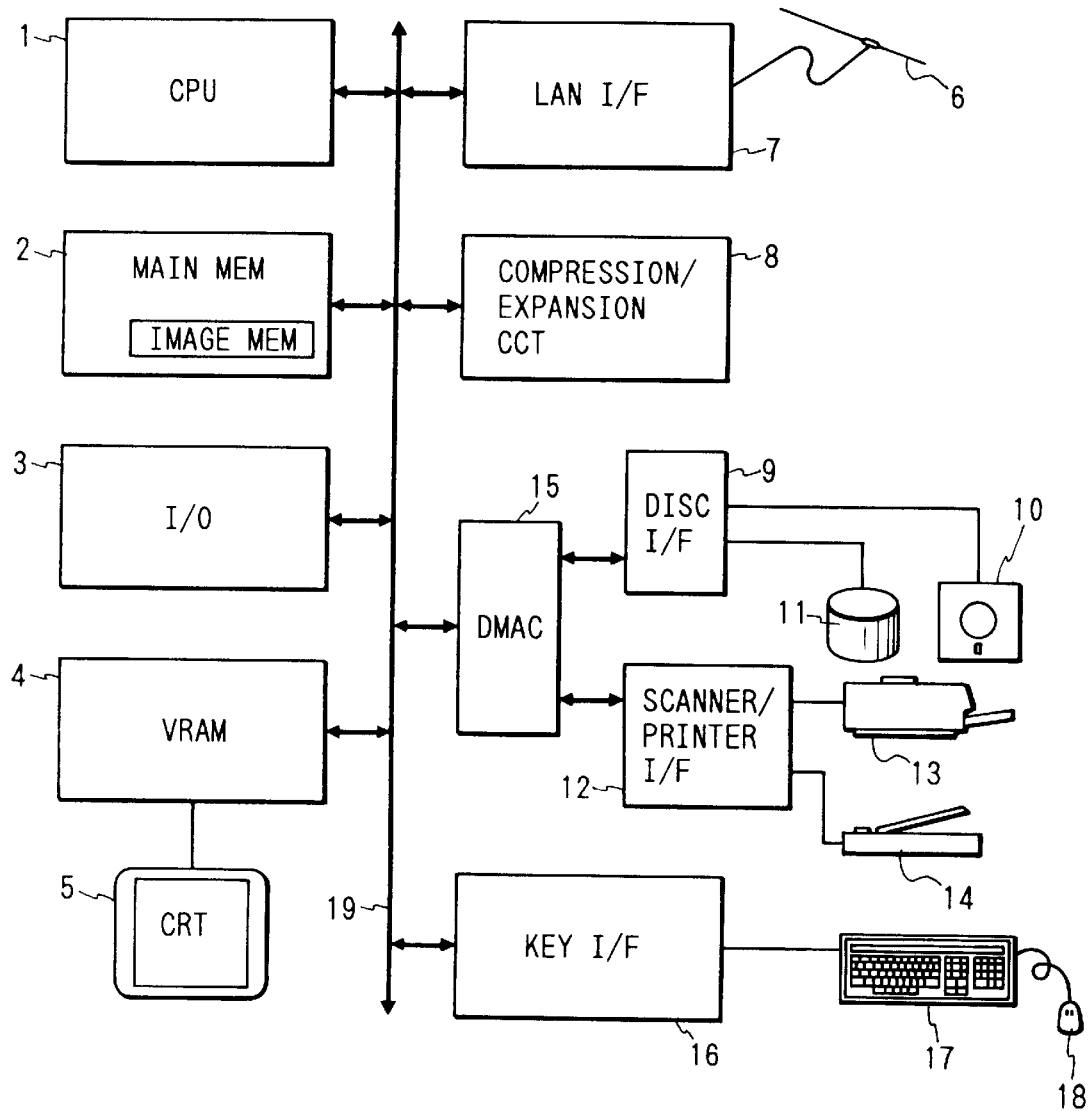
FIG. 2 is a block diagram showing a system construction of an image processing apparatus to which the present invention is applied.

Prior to explaining the present invention, a system construction of an image processing apparatus to which the present invention is applied will be first described with reference to FIG. 2. In FIG. 2, the following constructing portions are connected to a system bus 19.

A central processing unit (CPU) 1 controls the operation of the whole apparatus and also executes an image editing process in accordance with a system program stored in a main memory 2.

The main memory 2 has therein: an image memory to store the system program which is executed by the CPU 1 and image data as a target of image edition; and a work memory to store various kinds of data regarding the image process.

An input/output interface (I/O) 3 executes data transfer between the I/O 3 and an-external apparatus.

A video RAM (random access memory) 4 stores image data which is displayed on a CRT (display) 5. The image data in the video RAM 4 is sent to the CRT 5 and is displayed as a visible image. The image data stored in the video RAM 4 has a resolution of 100 dpi (dots per inch).

An LAN (Local Area Network) interface 7 executes data transfer between the LAN I/F 7 and another image processing apparatus connected to a LAN 6.

A compression/expansion circuit 8 relates to the present invention and compresses image data of 400 dpi in a multistage manner in accordance with an instruction from the CPU 1 thereby forming the compressed and encoded image data of 12.5 dpi.

The image data which has been compressed and encoded into the data of 12.5 dpi is expanded step by step in response to an instruction of the CPU 1, thereby expanding and decoding into the image data of 400 dpi. The compression/expansion circuit 8 executes a compressing/expanding process by the JBIG method. An internal construction of the compression/expansion circuit 8 will be described in detail shortly. In the embodiment, when the image data of 400 dpi which has been read by a scanner 14 is stored on a floppy disk 10 or a hard disc 11, it is converted into the compressed and encoded data of 12.5 dpi. When the image data is printed by a printer 13, the image data of 12.5 dpi stored in the floppy disk 10 or hard disc 11 is expanded and decoded into the image data of 400 dpi.

A direct memory access controller (DMAC) 15 is connected to a disc interface 9 and a scanner/printer interface 12. The DMAC 15 reads or writes the image data of the input/output device (scanner 14, printer 13) or memory medium (floppy disk 10, hard disc 11) from/into a memory area in the main memory 2 instructed from the CPU 1.

A key interface 16 transfers the information supplied from a keyboard 17 or a coordinates input apparatus 18 generally called a mouse to the CPU 1.

Figure 3:
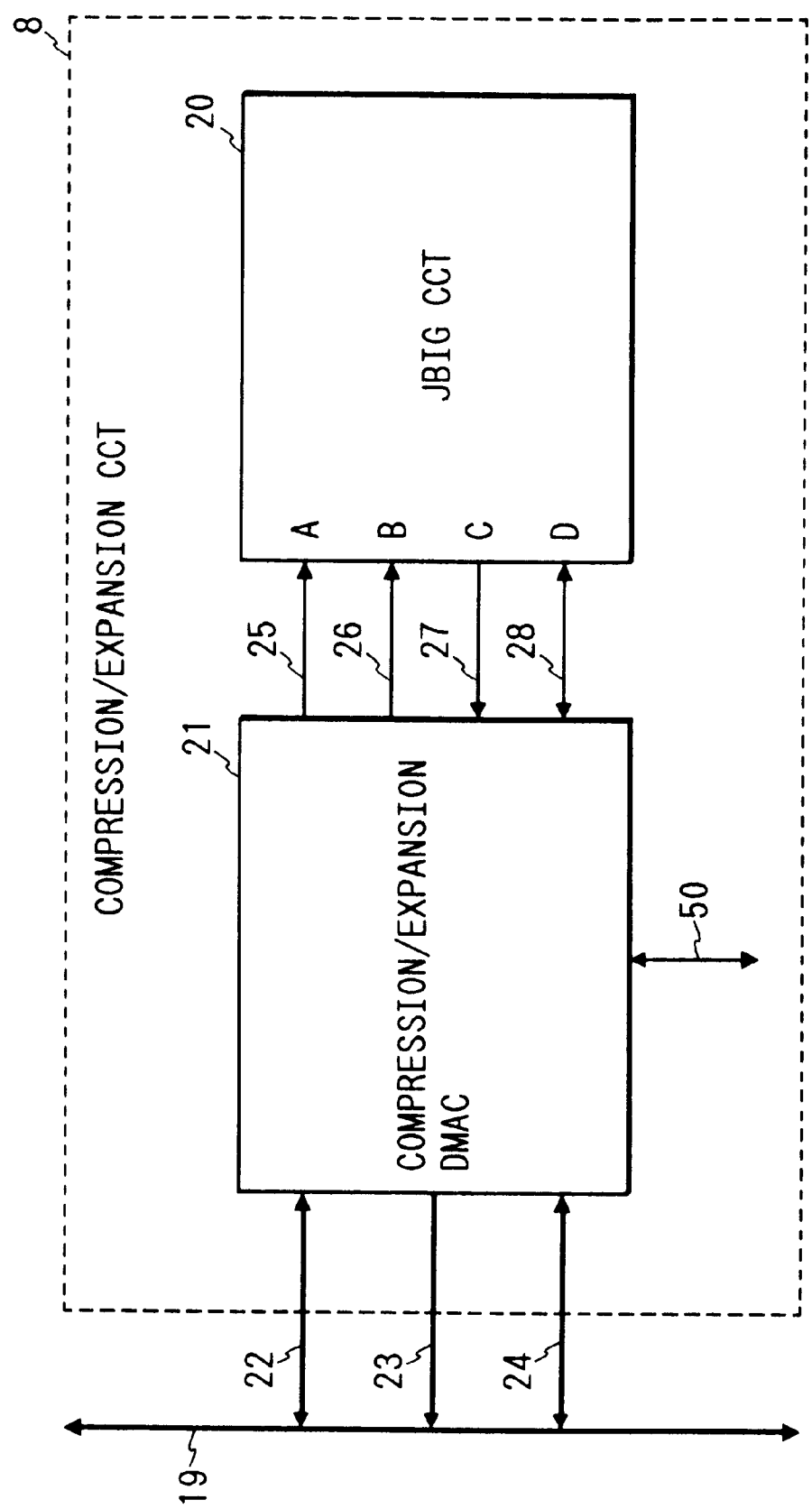
FIG. 3 is a block diagram showing a fundamental construction of a compression/expansion circuit 8 in FIG. 2.

FIG. 3 shows a fundamental construction of the compression/expansion circuit 8.

In FIG. 3, when a compression/expansion DMAC (Direct Memory Access Controller) 21 receives an instruction of the compression or expansion from the CPU 1, the compression/expansion DMAC 21 executes a process to sequentially read out the image data as a target to be subjected to an image process and the encoded data upon expansion from the image memory of the main memory 2.

The compression/expansion DMAC 21 also executes a process to write the image data formed for a period of time during which the image data is compressed or expanded step by step into the image memory and a process to read out the image data which is used to form the image data at the next stage or the encoded data upon compression from the image memory by a JBIG circuit 20.

The compression/expansion DMAC 21 operates as reading means and writing means of the present invention. For the above read/write access a R/W (read/write) signal is sent via a control signal line 22, data as a target to be accessed is sent via a signal line (data bus) 24, and an address signal via access is sent to a signal line (address bus) 23 When the compression/expansion DMAC 21 accesses to the image memory, an arbitrating process of a bus is executed between the compression/expansion DMAC 2 and the CPU 1 through a signal line 50. The CPU 1 abandons the right of use the bus.

The compression/expansion DMAC 21 supplies the image data read out from the image memory to the JBIG circuit (signal processing circuit of the invention) 20 by signal lines 25 and 26 in correspondence to the kind of image data. The compression/expansion DMAC 21 also receives through signal lines 27 and 28 the compressed image data and encoded data which are output from the JBIG circuit 20.

The JBIG circuit 20 receives the image data at the position of the reference pixel which is used for compression and the compressed image data at the position of the reference pixel and forms compressed image data at the target position. A compression ratio of the image data is ½ of its resolution.

In the case of reducing the resolution of the image data of, for example, 400 dpi, step by step, such that 200 dpi→100 dpi—12.5 dpi, the present invention doesn't use the JBIG circuits serially as in the conventional apparatus. The invention is characterized in that one JBIG circuit is repetitively used like a loop and the image data of a resolution which is lower by one rank is formed and the image data which is necessary for the compressing process and the compressed image data are read out/written into (accessed) from/into the image memory by the compression/expansion DMAC 21.

Figure 1:
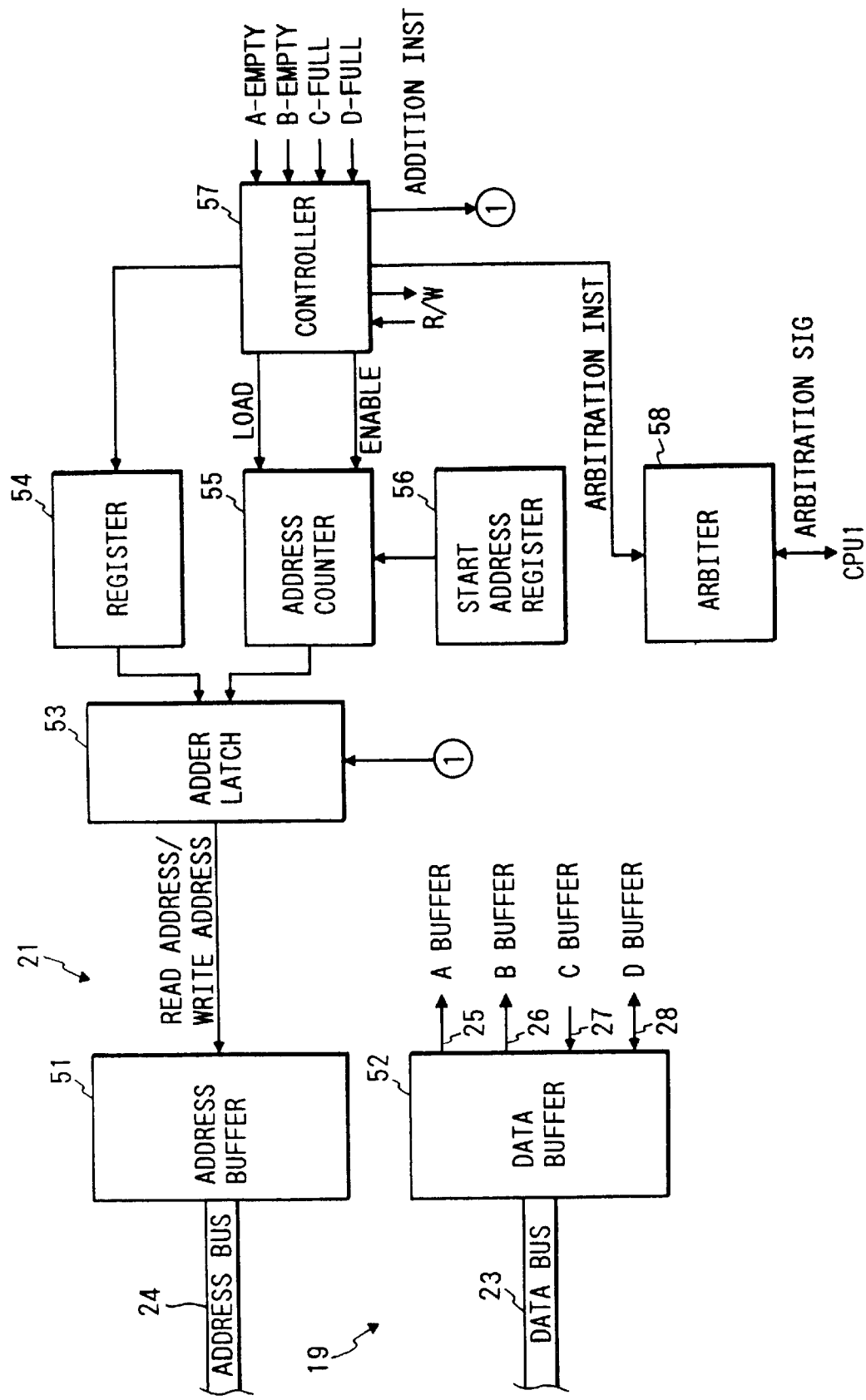
FIG. 1 is a block diagram showing a circuit construction of a compression/expansion DMAC 21 in FIG. 3.

FIG. 1 shows a circuit construction of the compression/expansion DMAC 21 in FIG. 3.

In FIG. 1, an address buffer 51 is connected to the address bus 23 (refer to FIG. 3) on the system bus 19 and supplies address signals for reading/writing to the image memory in the main memory 2.

An adder latch circuit (adding circuit) 53 can add a value which is held in a register 54 and a count value of an address counter 55. When an addition instruction is sent from a controller 57, the adder latch circuit 53 holds the result of the addition and supplies the addition value to the address buffer 51.

When no addition instruction is given from the controller 57, the adder latch circuit 53 holds the count value of the address counter 55 and supplies the count value to the address buffer 51.

In response to a load instruction from the controller 57, the address counter 55 starts the counting operation from a start value which is held in an start address register 56. An enable signal and clocks for counting (not shown) of the address counter 55 are given from the controller 57. The value which is held in the register 54 is also set by the controller 57.

The controller 57 determines the value which is held in the register 54 in accordance with the content of the image data which is read out from or written into the image memory.

A data buffer 52 transmits or receives data to/from either one of buffers A 70 to D 73 in the JBIG circuit 20 in accordance with an instruction from the controller 57. The data is transferred from the data bus 24 to the input data bus 24, The data held in the data buffer 52 is read out from or written into a memory area in the image memory shown by the address value held in the address buffer 51.

In the case where the data in the data buffer 52 is read out from or written into the image memory, an arbiter (arbitration circuit) 58 executes an arbitrating process with the CPU 1 and obtains the right to use the system bus 19 by an instruction from the controller 57. The controller 57 further generates an R/W signal to instruct the reading/writing operation of the data of the data buffer 52.

A circuit construction of the JBIG circuit 20 in FIG. 3 will now be described with reference to FIG. 4.

Figure 4:
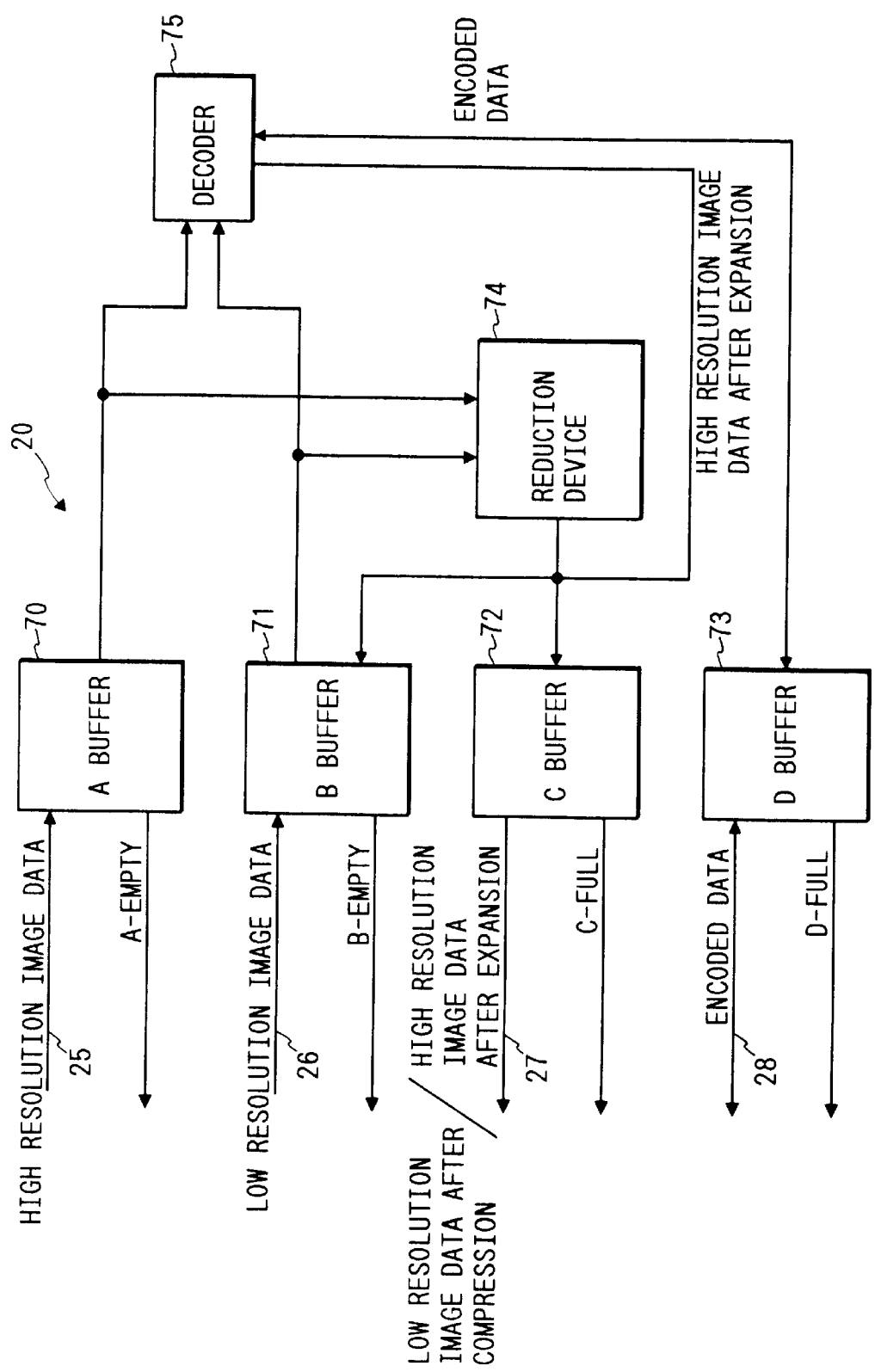
FIG. 4 is a block diagram showing a circuit construction of a JBIG circuit 20 in FIG. 3.

In FIG. 4, the A buffer 70 can store the image data on the high resolution side of an amount of four lines in the compressing process, more specifically, the image data of two words (64 bits) in one line. The image data at the position of the reference pixel in the storage data is sent to a reduction device 74 and a decoder 75. The storage data in the A buffer 70 is supplied from the compression/expansion DMAC 21 at a predetermined timing. The A buffer 70 is not used for the expanding process.

In the compressing process, the B buffer 71 can store the compressed image data of a low resolution which is lower by one rank (stage) of an amount of two lines corresponding to the image data of a high resolution of an amount of four lines. In the compressing process, the storage data of the B buffer 71 is supplied from the compression/expansion DMAC 21 at a predetermined timing. In the expanding process, the B buffer 71 can store the image data of a low resolution of an amount of two lines as a target to be expanded and corresponding to the encoded data which is stored into the D buffer 73. The storage data of the B buffer 71 is supplied from the compression/expansion DMAC 21.

The C buffer 72 can store the image data of an amount of two words. In the compressing process, the C buffer 72 holds the compressed image data of a low resolution of an amount of one word and supplies the image data to the compression/expansion DMAC 21. In the expanding process, the C buffer 72 holds the expanded image data of a high resolution and supplies the image data to the compression/expansion DMAC 21.

In the compressing process, the D buffer 73 holds the encoded data formed by the decoder 75 and supplies the encoded data to the compression/expansion DMAC 21. In the expanding process, the D buffer 73 receives the encoded data which is necessary for the decoder 75 from the compression/expansion DMAC 21.

The reduction device 74 extracts the image data at the positions of the reference pixels in the image data of a high resolution of the A buffer 70 and in the image data of a low resolution of the B buffer 71 and forms the compressed image data (image data of a low resolution) at the position of the target pixel and supplies to the C buffer 72.

In the compressing process, the decoder 75 extracts the image data at the positions of the reference pixels for encoding in the image data of the A buffer 70 and in the image data of the B buffer 71, thereby forming the encoded data. The formed encoded data is supplied to the D buffer 73.

In the expanding process, the decoder 75 sequentially extracts the encoded data of the D buffer 73 and the low resolution data of the B buffer 71 and supplies the decoded, namely, expanded image data of a high resolution to the C buffer 72.

The operation of the above circuit will now be described with reference to flowcharts of FIGS. 5 to 13. FIGS. 5 to 13 are flowcharts showing processing procedures of the compression/expansion DMAC 21.

(i) Compressing Process

Figure 16:
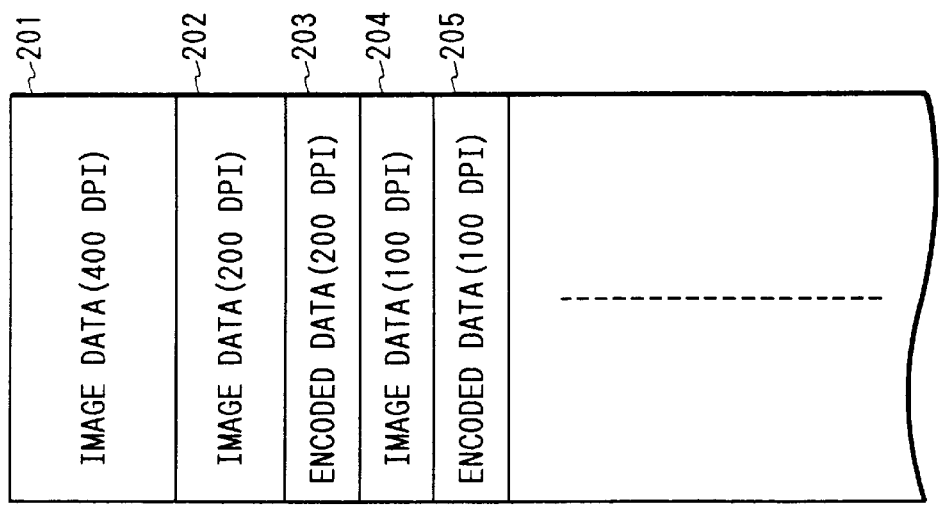

The image data of 400 dpi as a target to be compressed has been stored in a memory area shown by reference numeral 201 in FIG. 16 in the image memory of the main memory in FIG. 2. For convenience of explanation, it is assumed that the image data is set to a fixed capacity of one picture plane (i.e. the capacity of image data which may be displayed on one display plane of a CRT display). When the controller 57 (refer to FIG. 1) in the compression/expansion DMAC 21 receives a start instruction of the compressing process from the CPU 1, the controller 57 initializes the internal constructing circuit. After that, the controller 57 reads out the image data of an amount of two words and four lines from the head of a memory area 201 in the image memory and supplies into the A buffer 70 (processes until step S1 in FIG. 5).

Figure 8:
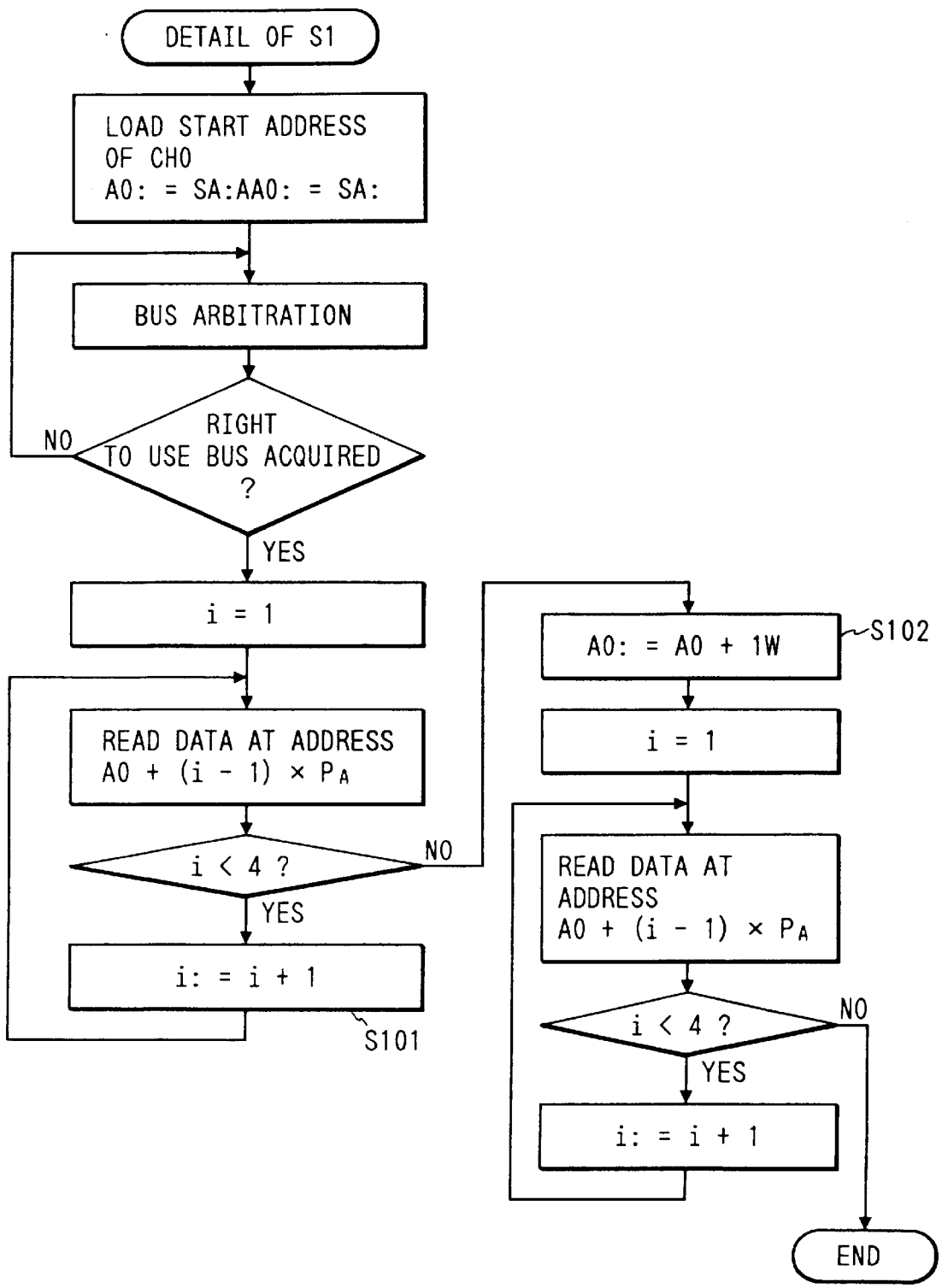

More specifically speaking, as shown in the processing procedure in FIG. 8, after completion of the initialization, the right to use the bus is received from the CPU 1 by the arbiter 58. After the right to use the bus is received, the controller 57 supplies a count start value (shown by SA in a timing chart of FIG. 14) of the address counter 55 from the address buffer 51 to the image memory through the adder latch circuit 53. Thus, the image data of one word of the first line is transferred from the image memory to the data buffer 52. The controller 57 transfers the data of the data buffer 52 to the memory area of the first line in the A buffer 70.

Subsequently, to set the head address of the second line in the image memory, the controller 57 changes the storage value of the register 54 (corresponding to the process to update the value of i into 2 in step S101 in the control procedure of FIG. 8). The image data of the second line is read into the data buffer 52. After that, the image data of the data buffer 52 is transferred to the memory area of the second line of the A buffer 70 by an instruction of the controller 57. After that, processes similar to those mentioned above are repeated and the image data of (four lines×one word) is fetched from the image memory into the A buffer 70.

Figure 14:
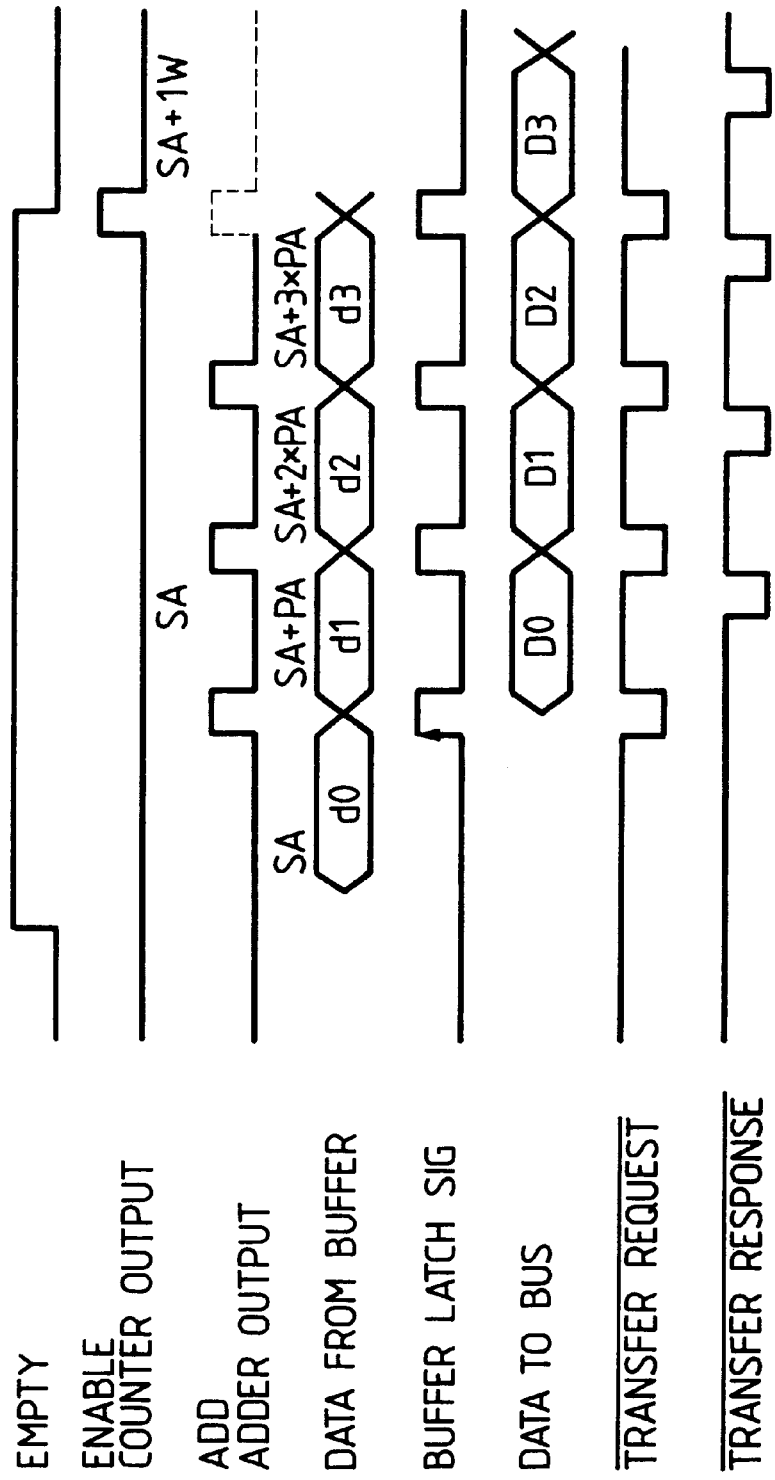
FIGS. 14 and 15 are timing charts each showing a signal generation timing in the compression/expansion DMAC 21.
Figure 15:
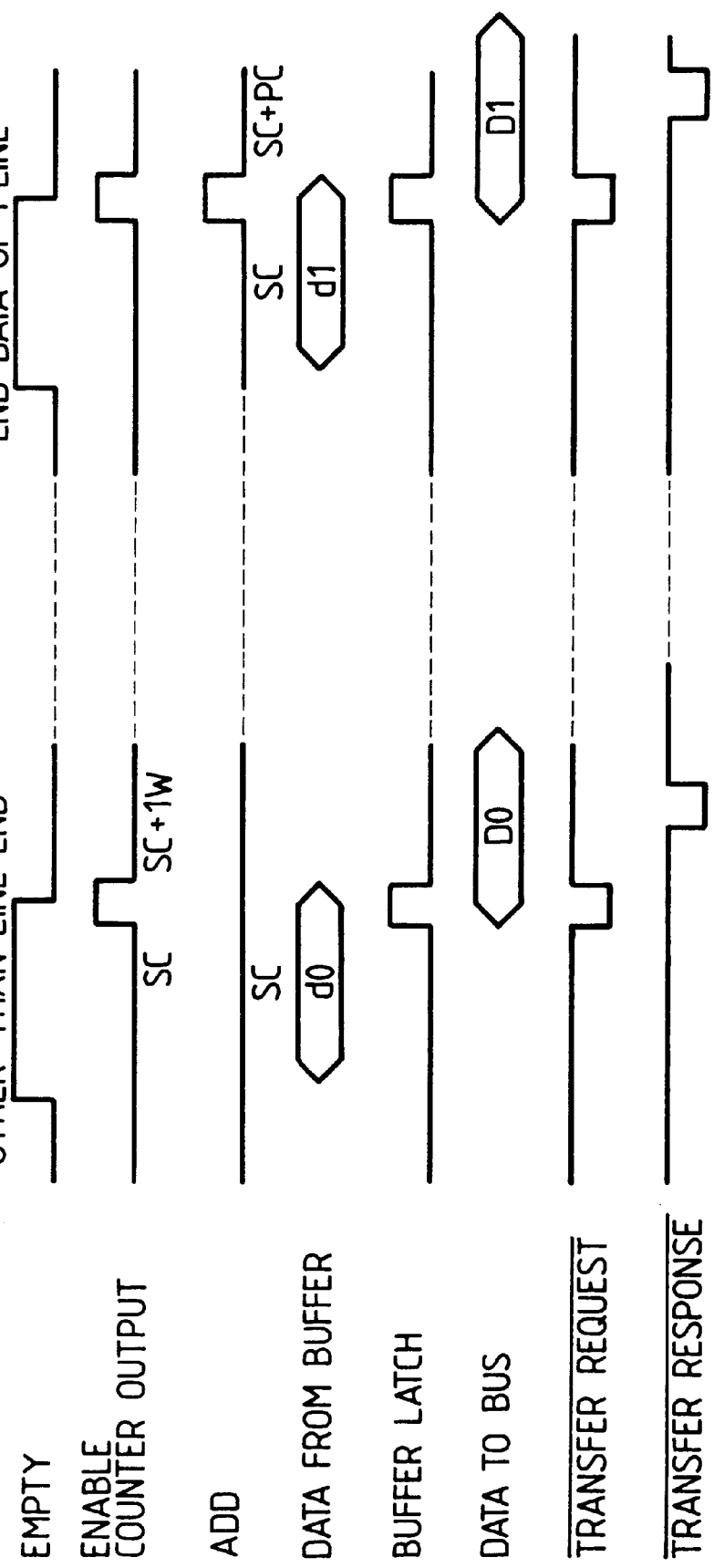

The controller 57 changes the start address of the address counter 55 to the second word or the first line (corresponding to the process in step S102 in FIG. 8) and fetches the image data in the image memory to the A buffer 70. In a manner similar to the above, the line is changed and the image data of the second word up to the fourth line is fetched into the A buffer 70. FIG. 14 shows a signal generation timing to fetch the data into the A buffer 70 as a reference. FIG. 15 shows a signal generation timing to fetch the data into the B buffer, which will be explained hereinlater.

After the image data of 400 dpi of (4 lines×2 words) was stored into the A buffer 70 as mentioned above, the reduction device 74 and the decoder 75 are activated. The reduction device 74 starts the compressing process. The decoder 75 starts the encoding process.

Figure 21:
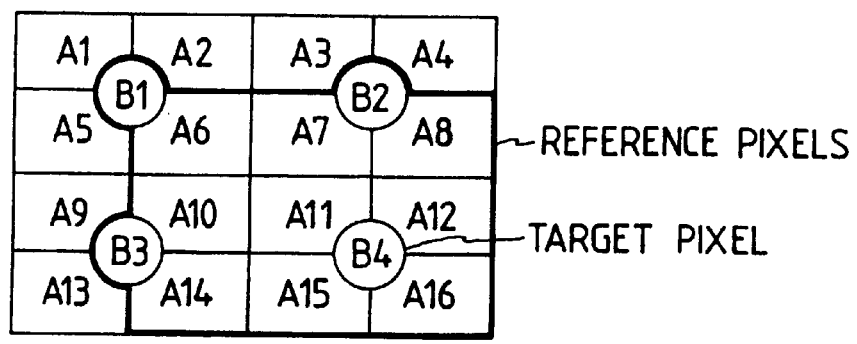
FIG. 21 is an explanatory diagram showing the relation between the target pixels and the reference pixels in a compressing-process.

More specifically speaking, a plurality of image data at the positions of the reference pixels in the image data of the A buffer 70 and B buffer 71 are supplied to the reduction device 74, so that the image data at the position of the target pixel (refer to FIG. 21) is formed. When the compressing process of the first line is started, compressed image data has not yet been formed. However, the compressed image data (200 dpi) at the first position is formed on the assumption that, for instances the compressed image data of "0" exists as a default value. The formed compressed image data is stored to the head pixel position of the first word in the B buffer 71 and is also stored to the head pixel position of the first word in the C buffer 72. The reduction device 74 subsequently moves the target pixel position to the second pixel position on one line and forms the compressed image data (200 dpi) by using both of the image data (400 dpi) of the A buffer 70 and the image data (200 dpi) of the B buffer 71 at the reference pixel positions corresponding to the target pixel position. The compressed image data which has been formed before is used as image data at the reference pixel position in this instance. After that, the reduction device 74 sequentially forms the compressed image data along the line direction. The decoder 75 also performs the encoding process by using the image data at the reference pixel positions of the A buffer 70 and B buffer 71 and writes the formed encoded data into the D buffer 73 (corresponding to the process in step S2 in FIG. 5).

Figure 5:
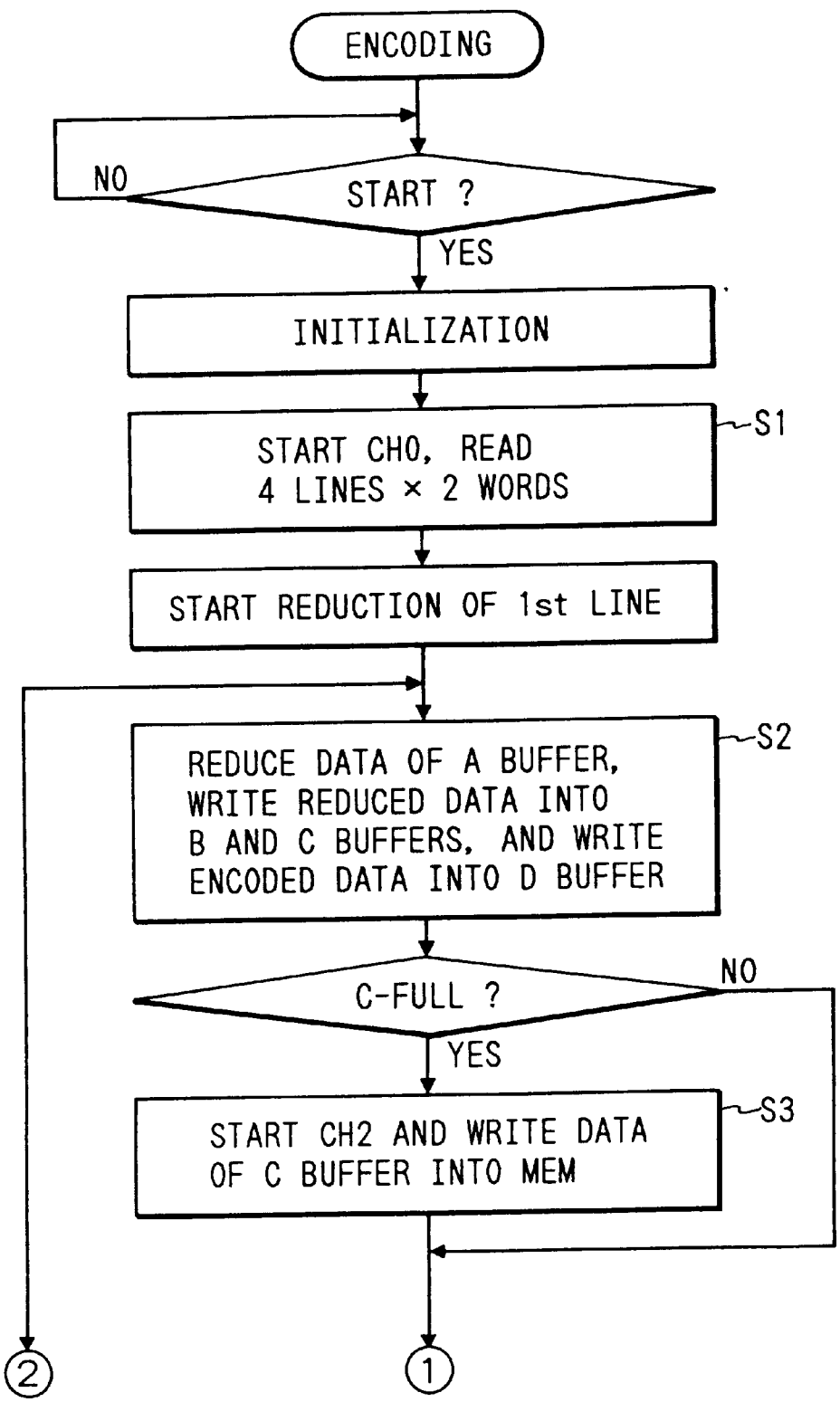
FIGS. 5 to 13 are flowcharts each showing a processing procedure of a compression/expansion circuit DMAC 21.
Figure 6:
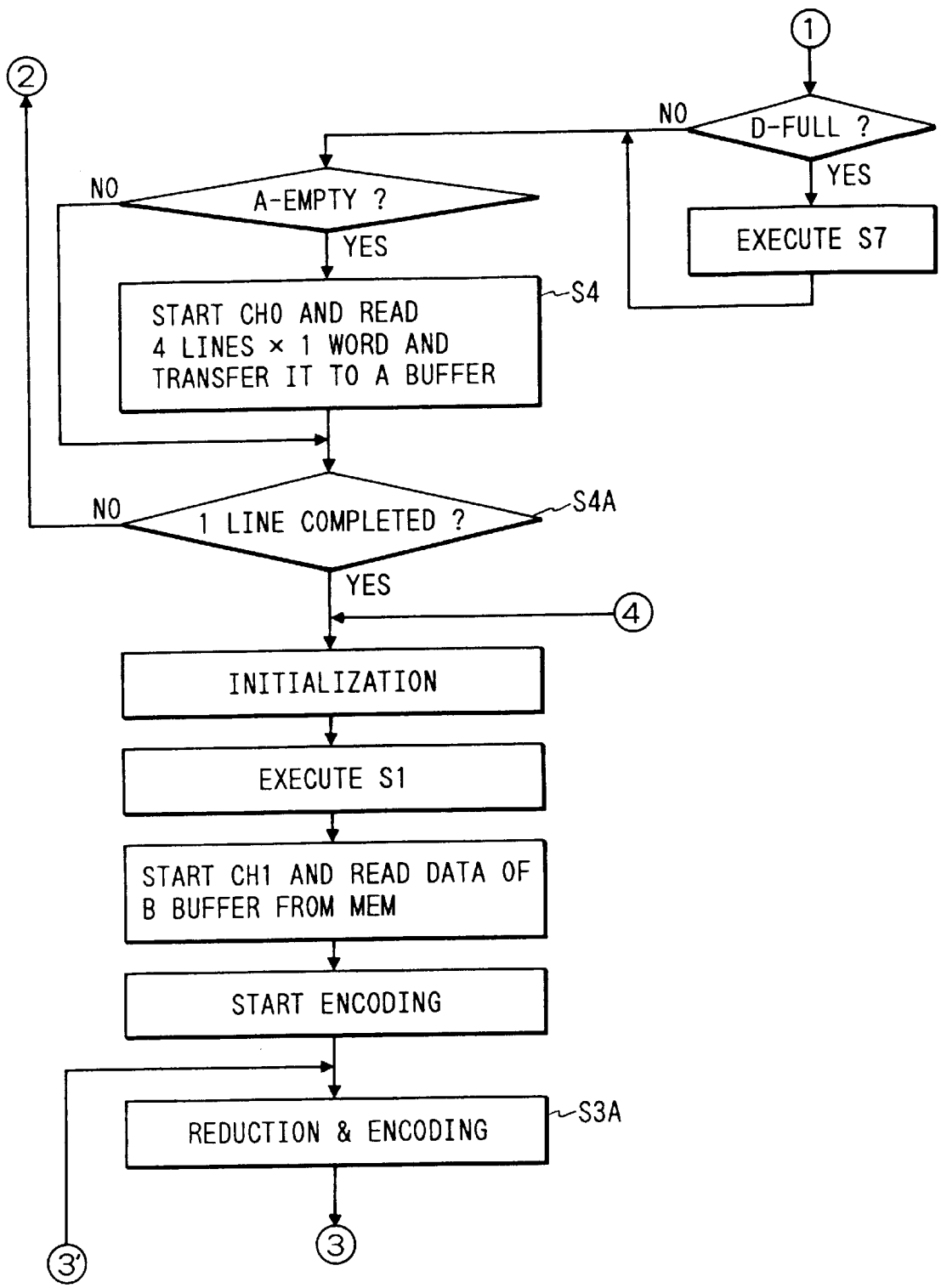
Figure 7:
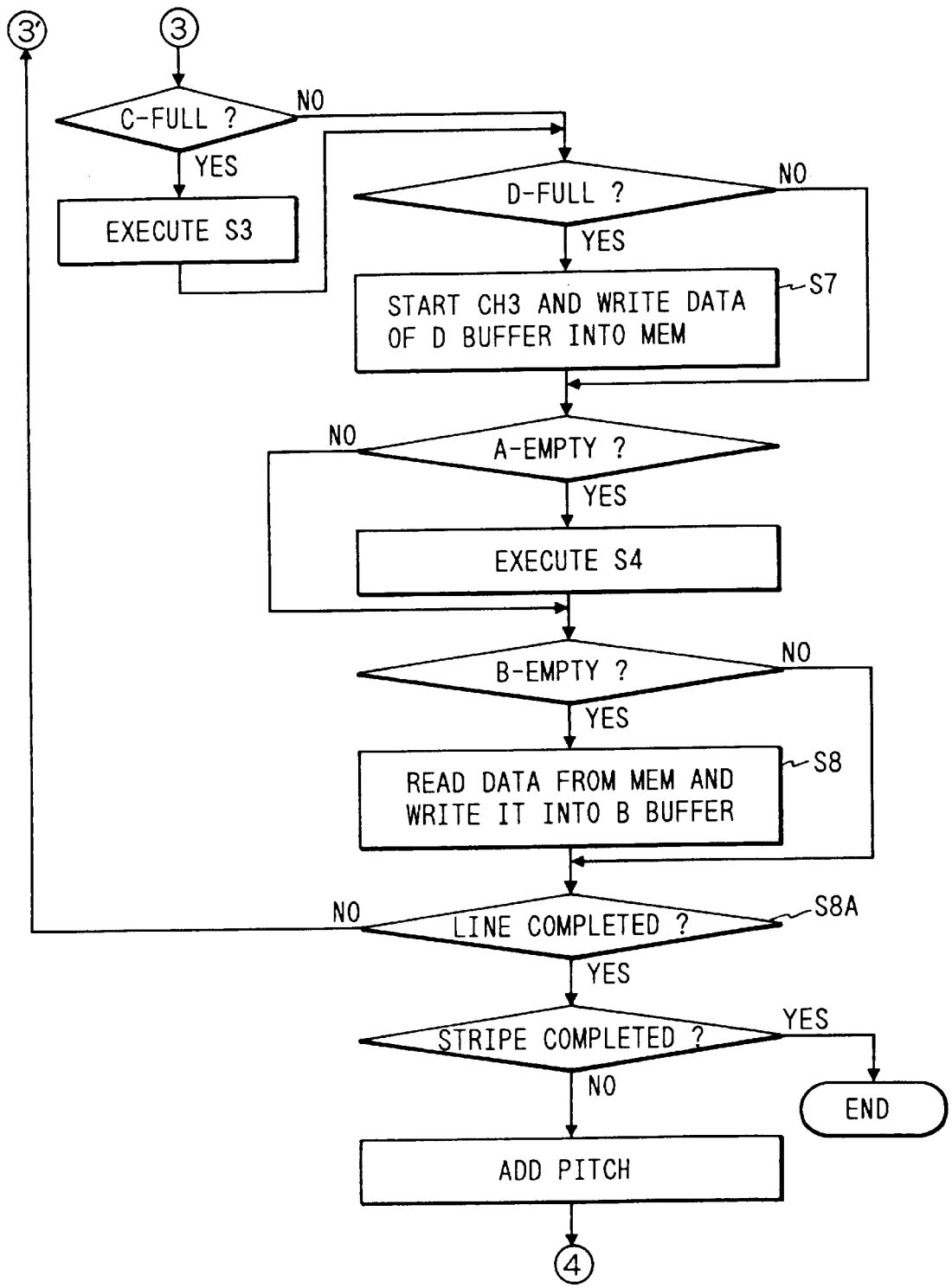
Figure 18:
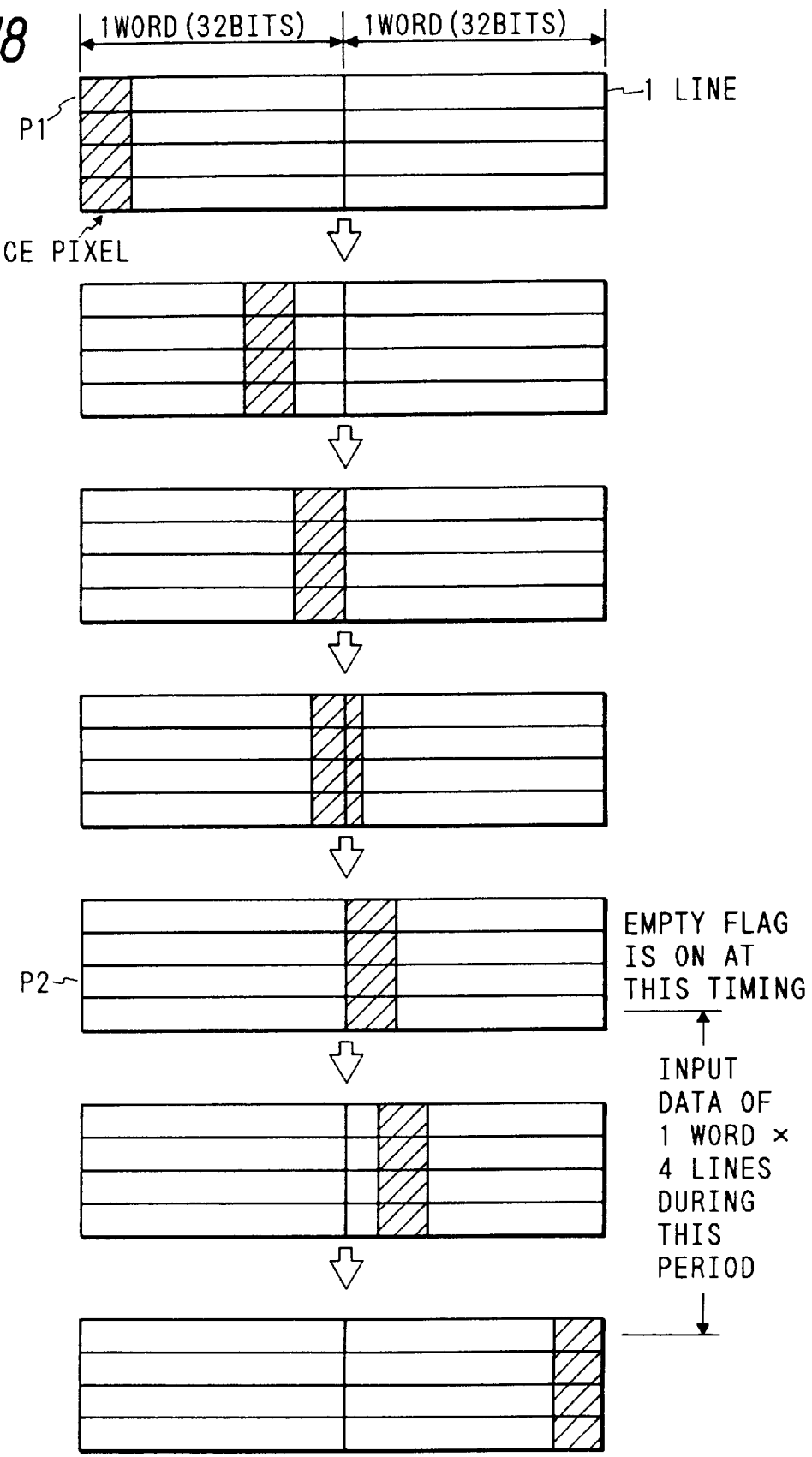
FIG. 18 is an explanatory diagram showing a timing to store data into an A buffer 70 in FIG. 4.

As mentioned above, the compressing process and the encoding process are synchronously executed (loop process between step S2 in FIG. 5 and step S4A in FIG. 6). In this embodiment, since shift registers (or FIFO memories) are used in the A to D buffers, in the A buffer 70, the image data of four lines is shifted on the storage positions every compressing process. Therefore, when a state of $P_2$ shown in FIG. 18 is obtained, that is, at a time point of the end of the compressing process of one word, an A-empty signal is generated from the A buffer 70. When the controller 57 detects the input of the A-empty signal, the controller 57 reads out the image data of (4 lines×1 word) from the image memory and supplementally transfers into the A buffer 70 (step S4 in FIG. 6).

Figure 19:
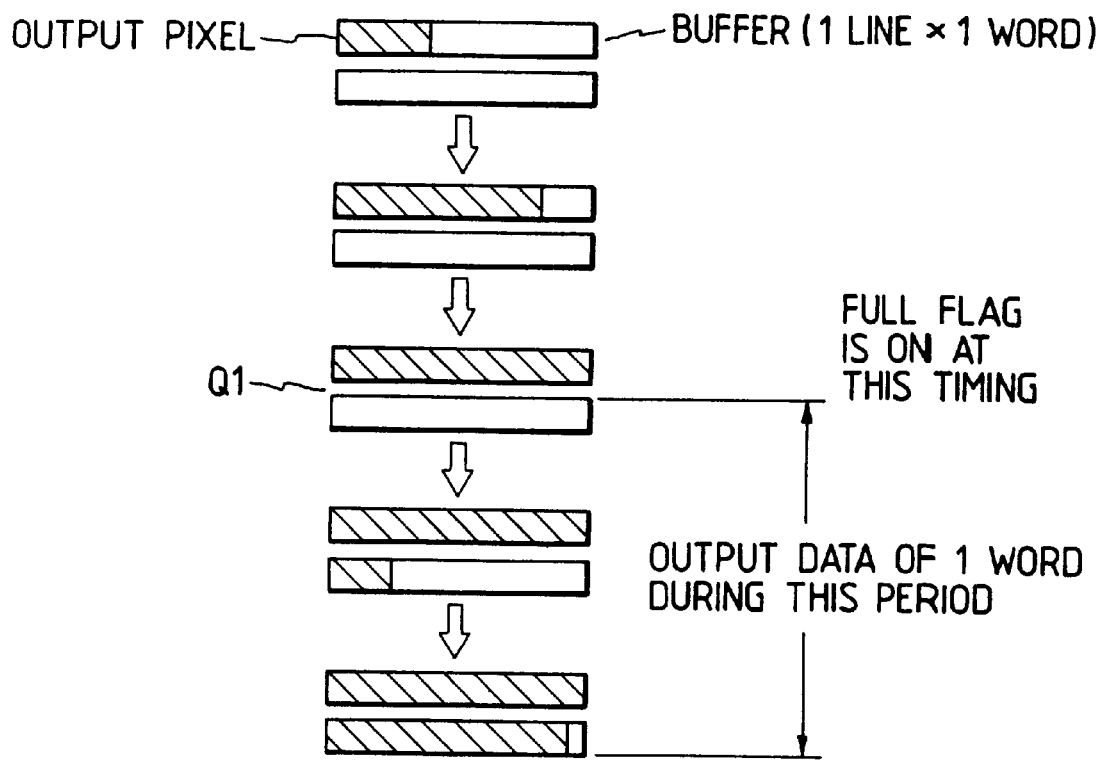
FIG. 19 is an explanatory diagram showing a timing to generate data from a B buffer 71 in FIG. 4.

Similarly, when the compressed image data of one word is stored into the C buffer 72 as shown in FIG. 19 the compressed image data is transferred into an image data memory area 202 (refer to FIG. 16) of 200 dpi in the image memory and is written therein on the basis of an instruction from the controller 57 (step S3 in FIG. 5).

Figure 9:
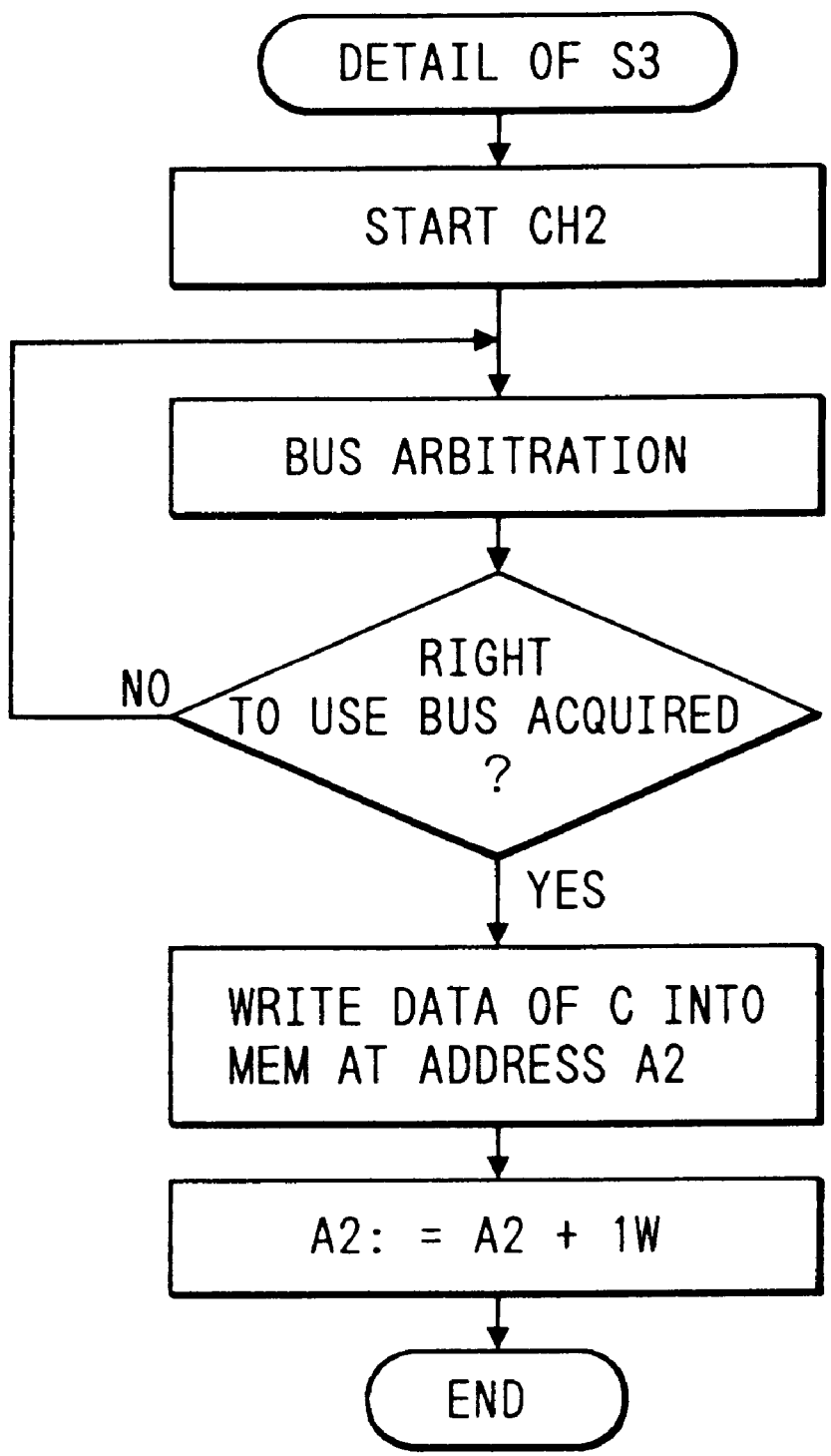
Figure 10:
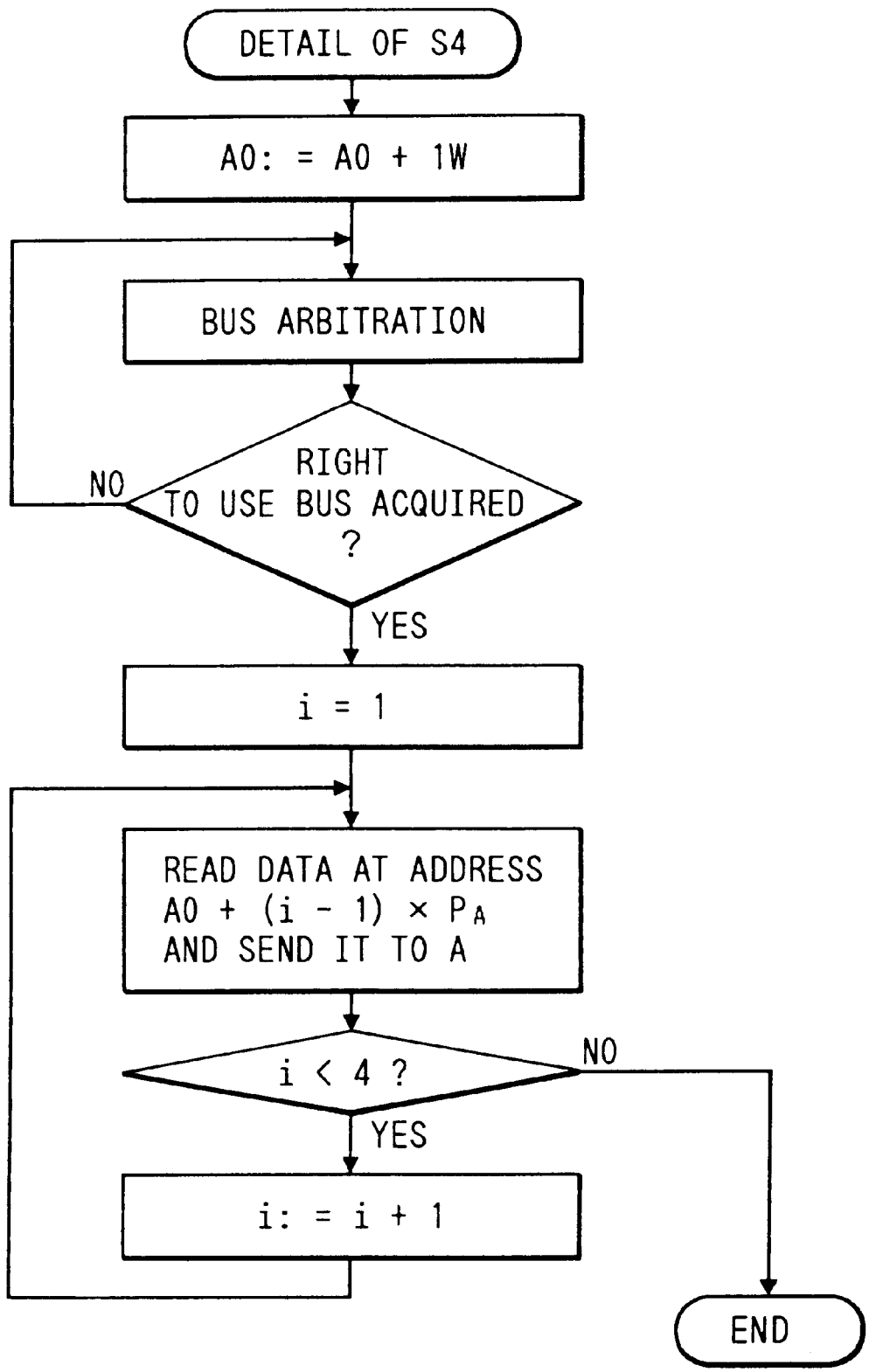

Since the reading/writing processes for the image memory are substantially similar to the detailed process in step S1 described by using FIG. 8 (however, the read/write addresses differ), the detailed processing procedures in steps S3 and S4 are shown in FIGS. 9 and 10 and their descriptions are omitted.

Figure 11:
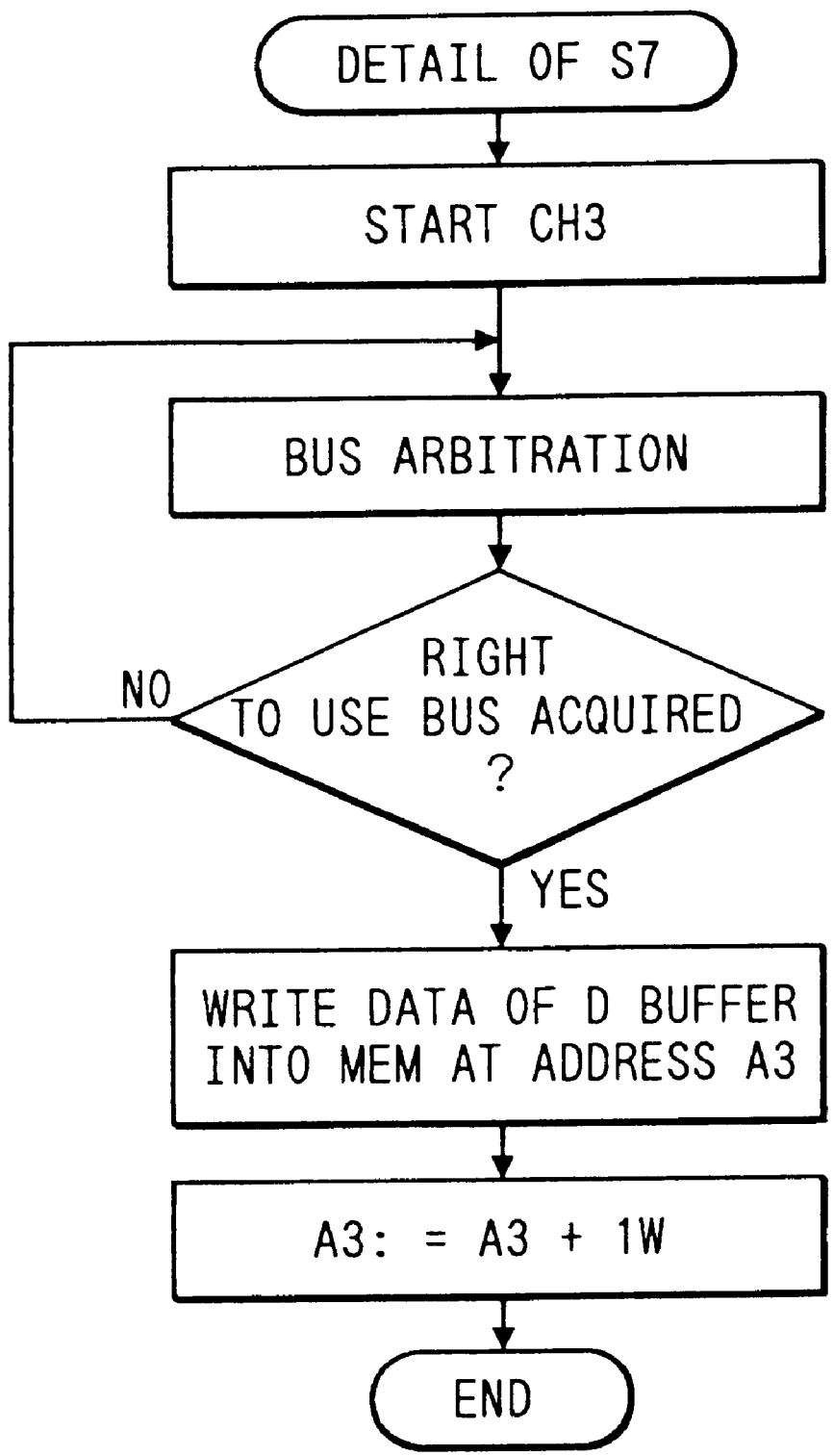

Although not shown in the control procedures of FIGS. 5 and 6, with respect to the D buffer 73, in a manner similar to the above, at a time point when the encoded data of one word is formed, the formed encoded data is also transferred and written into an encoded data memory area 203 (refer to FIG. 16) in the image memory by an instruction of the controller 57. FIG. 11 shows a detailed processing procedure for the above processes.

When the compressed image data of one line is formed as mentioned above (YES in the discriminating step S4A in FIG. 6), in order to read out the image data of (4 lines×2 words) from the first line in the image data of 400 dpi in the image memory, the controller 57 determines the initial set values of the registers and fetches the image data (400 dpi) of (4 lines×2 words) into the A buffer 70. Subsequently, the controller 57 reads out the compressed image data of 200 dpi of (2 lines×2 words) which is used together with the above image data of 400 dpi from the memory area 202 in the image memory and transfers to the B buffer 71.

The controller 57 subsequently allows the reduction device 74 and the decoder 75 to execute the compressing process and encoding process. During this period of time, the controller 57 monitors the storage states of the A to D buffers 70 to 73. With resepct to the A buffer 70 and B buffer 71, after completion of the compressing and encoding processes of the image data of one word, the image data corresponding to each resolution is read out from the image memory and supplied into each buffer. With regard to the C buffer 72 and D buffer 73, each time the data of one word is stored, the image data is written into the corresponding memory area on the image memory side by an instruction of the controller 57. Such processes are executed with regard to the compressed image data of one line (loop process in steps S3A to S8A in FIGS. 6 and 7).

The compressing process of each line as mentioned above is executed the number of times corresponding to one stripe as a single transfer unit and the control procedure is finished.

Subsequently, the controller 57 forms the image data of 100 dpi by the processing procedures of FIGS. 5 to 11 while using the image data of 200 dpi in the memory area 202 in the image memory as target data to be compressed. The formed compressed data is written into the memory area 204 of 100 dpi in the image memory. The formed encoded data is also written into a memory area 205.

In the controller 57, the number of resolution changing times of the target image data to be compressed is counted by an internal counter. When the number of resolution changing times reaches a count value corresponding to the image data of 12.5 dpi, the above compressing process is finished.

When the image data is compressed and encoded up to a predetermined resolution, the CPU 1 reads out the compressed image data of the memory area of 12.5 dpi in the image memory and the encoded data at the multistage in each memory area in accordance with an end signal from the controller 57 and preserves the read-out data to the disc designated by the user. After that, the above processes, for example, the compressing processes about the group of image data of 400 dpi of one picture plane or a group of image data of 400 dpi designated are executed by the compression/expansion circuit 8.

(ii) Decoding Process

Figure 12:
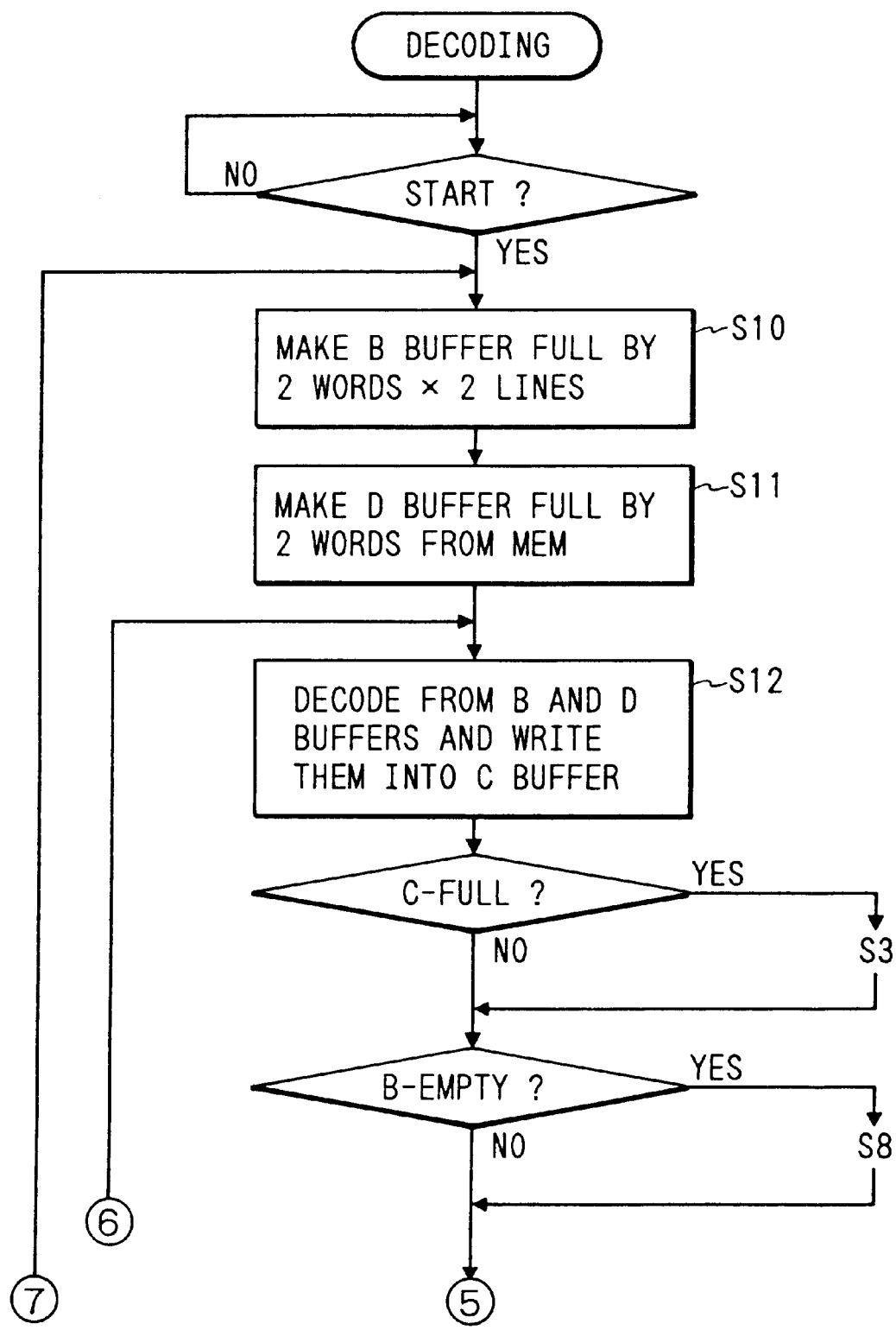
Figure 13:
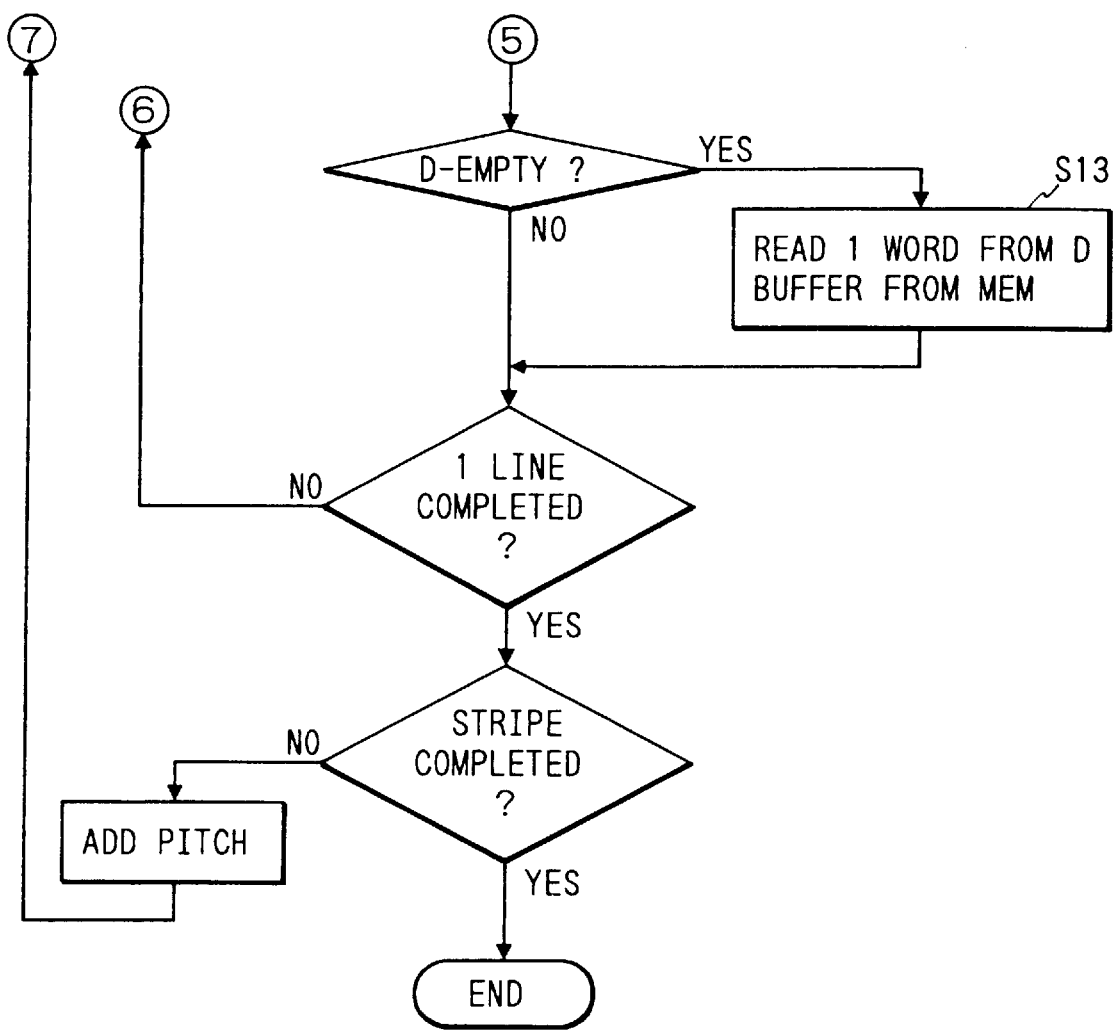

FIGS. 12 and 13 show flowcharts for processing procedure of the decoding processes.

Figure 17:
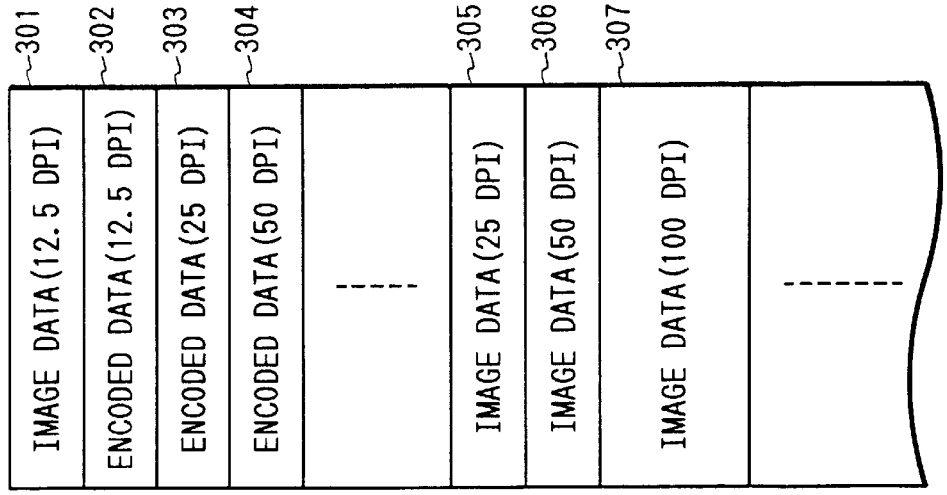
FIGS. 16 and 17 are explanatory diagrams showing contents of storage information in an image memory in a compressing process.

The image data of the lowest resolution of 12.5 dpi in memory areas 301, 302,—(refer to FIG. 17) in the image memory and the encoded data at each stage area read out from the disk and stored by the CPU 1.

The controller 57 of the compression/expansion DMAC 21 transfers the image data of 12.5 dpi in the image memory into the B buffer 71 (refer to FIG. 4) in the JBIG circuit 20 and transfers the encoding data for 12.5 dpi to the D buffer 73 and allows the decoder 75 to execute the decoding. The decoded image data (12.5→25 dpi) is written into the C buffer 72.

The controller 57 writes the decoded image data into the corresponding memory area (in this case, area 305) in the image memory every word and supplies the data into the B buffer 71 and D buffer 73 on a word unit basis.

When the image data of 12.5 dpi of an amount of one stripe is decoded into the image data of 25 dpi as mentioned above, the controller 57 executes a new expansion control for the image data of 25 dpi as a target to be expanded. After that, by repeating the above expanding process, the compression/expansion circuit 8 forms the image data of 400 dpi. Subsequently, the CPU 1 reads out the image data of 400 dpi from the image memory and allows the printer 13 to print and output or executes an image editing process or the like.

In addition to the above-described embodiment, i.e. the first embodiment the invention can be applied to the following other examples.

1) In the first embodiment, the image data of 400 dpi is compressed into the image data of 12.5 dpi and stored into the floppy disk 10 The image data of 100 dpi formed during the compression is used to display on the CRT 5. For this purpose, all of the image data which have been compressed step by step are stored in the image memory. However, in the case where the compressed image data at a halfway stage is unnecessary, it is sufficient to prepare the memory areas corresponding to two stages. That is, as shown in FIG. 20, the image data of 400 dpi is stored into the first memory area and the compressed image data of 200 dpi is stored into the second memory area. After the content in the first memory area was erased, the compressed image data of 100 dpi is stored into the first memory area. By alternately storing the compressed image data into the two memory areas as mentioned above, the memory areas which are necessary for the compressing process can be reduced. It will be obviously understood that the expanding process can be also performed by using only two memory areas in a manner similar to that mentioned above.

2) Although the compressed/expanded data has been stored into the first image memory which is used for image edition in the embodiment, a special memory can be also provided in the compression/expansion circuit 8. In this case, by using a dual port memory, the CPU 1 can execute, for instance, both of the writing operation of the target image data to be compressed and the reading operation of the compressed image data for the dual port memory in parallel with the process of the compression/expansion circuit 8.

3) Although the first embodiment has been described with respect to the example in which the image data for preservation and storage is formed by the compression/expansion circuit 8, it is also possible to use the compression/expansion circuit of the invention for a facsimile apparatus and to execute the compressing and expanding processes of the image data for transmission and reception of the data.

4) In the first embodiment, in consideration of the use of a digital processor for the controller 57 in the compression/expansion DMAC 21, the data to be accessed for the image memory is stored into the data buffer 52 in FIG. 1 and is distributed into the A to D buffers 70 to 73 in the JBIG circuit 20. However, in case of constructing the controller 57 by a register, a timing generating circuit, and the like, the controller 57 and a special reading circuit or writing circuit for the image memory can be also provided for each of the A to D buffers 70 to 73. In this case, it is possible to directly independently access from the A to D buffers to the image memory every buffer, so that there is no need to use the data buffer 52 in FIG. 1. However, it is necessary to provide an arbitrating circuit such that the access timings of a plurality of buffers are not set to the same timing.

5) Although the first embodiment has been described with respect to the example in which the resolution of the image data is reduced from 400 dpi to 12.5 dpi, the compressing process can be also stopped during the process in the case where there is no change between the content of the compressed image data and the content of the image data before compression, for example, a white image of the whole picture plane or a painted black image. In this case, such a difference between both of the image data is calculated by an arithmetic operating unit and the result of the calculation (difference) is compared with a threshold value by a comparator. When the above difference is equal to or less than the threshold values a discrimination output signal of the comparator is supplied as a stop signal to the controller 57.

According to the present invention as described above, the compressing and expanding processes of multistage can be executed by using only one set of reducing circuit and encoding/decoding circuit. As compared with the conventional apparatus, consequently, the number of circuit parts can be reduced and the circuit construction is also simplified.

What is claimed is:

1. A compressing circuit for compressing data, comprising:

storage means for storing data;

address management means for managing addresses of said storage means;

reading means for reading the data stored at a first address of said storage means, the first address being designated by said address management means;

a single compressing means for compressing the data of a n-th hierarchy having a first resolution read by said reading means into data of a (n+1)-th hierarchy having a second resolution, where n is an integer;

storage control means for controlling said storage means to store the data compressed by said compressing means at a second address designated by said management means, wherein the first address differs from the second address; and control means for controlling said reading means, said compressing means, and said storage control means, to repeat a series of operations comprising data reading, data compression and data storage so as to generate image data compressed in m hierarchies from its original resolution, where m is an integer.

2. A circuit according to claim 1, further having counter means, and wherein said control means continues controlling until a count value of said counter means reaches a predetermined value.

3. A circuit according to claim 1, wherein said storage means has first and second storage areas, in the case where the data transferred by said transfer means is the data stored in said first storage area, the data compressed by said single compressing means is stored in said second storage area, and in the case where the data transferred by said transfer means is the data stored in said second storage area, the data compressed by said single compressing means is stored into the first storage area.

4. An expanding circuit for expanding data, comprising:

storage means for storing data;

address management means for managing addresses of said storage means;

reading means for reading the data stored at a first address of said storage means, the first address being designated by said address management means;

a single expanding means for expanding the data of a n-th hierarchy having a first resolution read by said reading means into data of a (n+1)-th hierarchy having a second resolution, where n is an integer;

storage control means for controlling said storage means to store the data expanded by said expanding means at a second address designated by said address management means, wherein the first address differs from the second address; and control means for controlling said reading means, said expanding means, and said storage control means to repeat a series of operations comprising data reading, data expansion and data storage so as to generate image data expanded in m hierarchies from its original resolution, wherein m is an integer.

5. A circuit according to claim 4, further having counter means, and wherein said control means continues controlling until a count value of said counter means reaches a predetermined value.

6. A circuit according to claim 4, wherein said storage means has first and second storage areas, in the case where the data transferred by said transfer means is the data stored in said first storage area, the data expanded by said expanding means is stored into the second storage area, and in the case where the data transferred by the transfer means is the data stored in the second storage area, the data expanded by the expanding means is stored into the first storage area.

7. A compressing/expanding circuit for performing compressing and expanding processes of data, comprising:

storage means for storing data;

address management means for managing addresses of said storage means;

reading means for reading the data stored at a first address of said storage means, the first address being designated by said address management means;

a single compressing means for compressing the data of a n-th hierarchy having a first resolution read by said reading means into data of a (n+1)-th hierarchy having a second resolution, where n is an integer;

a single expanding means for expanding the data of the n-th hierarchy having the first resolution read by said reading means into data of the (n+1)-th hierarchy having the second resolution;

storage control means for controlling said storage means to store the data compressed by said compressing means or the data expanded by said expanding means at a second address designated by said address management means, wherein the first address differs from the second address;

compression control means for controlling said reading means, said compressing means, and said storage control means to repetitively operate;

expansion control means for controlling said reading means, said expanding means, and said storage control means to repetitively operate; and designating means for designating either one of the compressing and expanding processes, wherein in the case where the compressing process is designated by said designating means, said reading means, said compressing means, and said storage control means are controlled by said compression control means so as to repeat a series of operations comprising data reading, data compression and data storage to generate image data compressed in m hierarchies from its original resolution, wherein m is an integer, and in the case where the expanding process is designated by said designating means, said reading means, said expanding means, and said storage control means are controlled by said expansion control means so as to repeat a series of operations comprising data reading, data expansion and data storage to generate image data expanded in m hierarchies from its original resolution, wherein m is an integer.

8. A circuit according to claim 7, further having counter means, and wherein said compression control means or said expansion control means continues controlling until a count value of said counter means reaches a predetermined value.

9. A circuit according to claim 7, wherein said storage means has first and second storage areas, in the case where the data transferred by said transfer means is the data stored in the first storage area, the data compressed by said compressing means or the data expanded by said expanding means is stored into the second storage area, and in the case where the data transferred by the transfer means is the data stored in the second storage areas, the data compressed by the compressing means or the data expanded by the expanding means is stored into the first storage area.

10. A method of compressing data, comprising the steps of:

an address managing step of managing addresses of a storage means which stores data;

a first step of reading out data stored in the storage means at a first address of said storage means designated by said address managing step;

a first step of compressing, using a single compressor, the read-out data of a n-th hierarchy having a first resolution in said first step of reading into data of a (n+1)-th hierarchy having a second resolution, where n is an integer;

a first step of storing the data compressed by said first step of compressing into the storage means at a second address designated by said address managing step, wherein the first address differs from the second address;

a second step of reading out the data stored in the storage means at the second address;

a second step of compressing, using the single compressor, the data of the (n+1)-th hierarchy read out in the second read out step into data of a (n+2)-th hierarchy having a third resolution;

a second step of storing the data compressed by said second step of compression into the storage means at the first address designated by said address managing step; and repetitively controlling the reading steps, processing steps, and storing steps, thereby repeating a series of operations consisting of data reading, data compression and data storage so as to generate image data compressed in m hierarchies from its original resolution, wherein m is an integer.

11. An information processing apparatus comprising:

receiving means for receiving data supplied from an external apparatus;

storage means for storing the data received by said receiving means;

address management means for managing addresses of said storage means;

reading means for reading the data stored at a first address of said storage means, the first address being designated by said address management means;

a single expanding means for expanding the data of a n-th hierarchy having a first resolution read by said reading means into data of a (n+1)-th hierarchy having a second resolution, where n is an integer;

storage control means for controlling said storage means to store the data expanded by said expanding means at a second address designated by said address management means, wherein the first address differs from the second address;

control means for controlling said reading means, said expanding means, and said storage control means to repeat a series of operations comprising data reading, data expansion and data storage so as to generate image data expanded in m hierarchies from its original resolution, wherein m is an integer; and output means for outputting the image data expanded in m hierarchies by said expanding means and stored in said storage means.

12. A compressing method of compressing data, comprising:

a storage step of storing data in a storage means;

an address management step of managing addresses of said storage means;

a reading step of reading the data stored at a first address of said storage means, the first address being designated by said address management step;

a compressing step, using a single compressor, of compressing the data of a n-th hierarchy having a first resolution read by said reading step into data of a (n+1)-th hierarchy having a second resolution, where n is an integer;

a storage control step of controlling said storage means to store the data compressed by said compressing step at a second address designated by said address management step, wherein the first address differs from the second address; and a control step of controlling said reading step, said compressing step, and said storage control step, to repeat a series of operations comprising data reading, data compression and data storage so as to generate image data compressed in m hierarchies from its original resolution, wherein m is an integer.

13. A method according to claim 12, further having a counting step, and wherein said control step continues controlling until a count value of said counting step reaches a predetermined value.

14. A method according to claim 12, wherein said storage means has first and second storage areas, in the case where the data transferred by said transfer step is the data stored in said first storage area, the data compressed by said compressing step is stored in said second storage area, and in the case where the data transferred by said transfer step is the data stored in said second storage area, the data compressed by said compressing step is stored into the first storage area.

15. An expanding method of expanding data, comprising:

a storage step of storing data in a storage means at a first location;

a reading step of reading the data stored in the first location in said storage means;

an expanding step of expanding, using a single expander, the data of a n-th hierarchy having a first resolution read by said reading step into second data of a (n+1)-th hierarchy having a second resolution, where n is an integer;

a storage control step of controlling said storage step to store the data expanded by said expanding step in the storage means at a second location which differs from the first location; and a control step of controlling said reading step, said expanding step, and said storage control step to repeat a series of operations consisting of data transfer, data expansion and data storage so as to generate image data expanded in m hierarchies from its original resolution, wherein m is an integer.

16. A method according to claim 15, further having a counting step, and wherein said control step continues controlling until a count value of said counting step reaches a predetermined value.

17. A method according to claim 15, wherein said storage means has first and second storage areas, in the case where the data transferred by said transfer step is the data stored in said first storage area, the data expanded by said expanding step is stored into the second storage area, and in the case where the data transferred by the transfer step is the data stored in the second storage area, the data expanded by the expanding step is stored into the first storage area.

18. A compressing/expanding method of performing compressing and expanding processes of data, comprising:

a storage step of storing data having a first resolution in a storage means;

an address management step of managing addresses of the storage means;

a reading step of reading the data stored at a first address of said storage means, the first address being designated by said address management step;

a compressing step of compressing, using a single compressor, the data of a n-th hierarchy having a first resolution read by said reading step into data of a (n+1)-th hierarchy having a second resolution, where n is an integer;

an expanding step of expanding, using a single expander the data of the n-th hierarchy having the first resolution read by said reading step into data of the (n+1)-th hierarchy having a second resolution;

a storage control step of controlling said storage step to store the data, compressed by said compressing step or the data expanded by said expanding step at a second address designated by said address management step, wherein the first address differs from the second address;

a compression control step of controlling said reading step, said compressing step, and said storage control step to repetitively operate;

an expansion control step of controlling said reading step, said expanding step, and said storage control step to repetitively operate; and a designating step of designating either one of the compressing and expanding processes, wherein in the case where the compressing process is designated by said designating step, said reading step, said compressing step, and said storage control step are controlled by said compression control step so as to repeat a series of operations comprising of data transfer, data compression and data storage to generate image data compressed in m hierarchies from its original resolution, wherein m is an integer, and in the case where the expanding process is designated by said designating step, said reading step, said expanding step, and said storage control step are controlled by said expansion control step so as to repeat a series of operations comprising of data transfer, data expansion and data storage to generate image data expanded in m hierarchies from its original resolution, wherein m is an integer.

19. A method according to claim 18, further having a counting step, and wherein said compression control step or said expansion control step continues controlling until a count value of said counting step reaches a predetermined value.

20. A method according to claim 18, wherein said storage means has first and second storage areas, in the case where the data transferred by said transfer step is the data stored in the first storage area, the data compressed by said compressing step or the data expanded by said expanding step is stored into the second storage area, and in the case where the data transferred by the transfer step is the data stored in the second storage area, the data compressed by the compressing step or the data expanded by the expanding step is stored into the first storage area.

21. An information processing method comprising:

a receiving step of receiving data supplied from an external apparatus;

a storage step of storing the data received by said receiving step in a storage means;

an address management step of managing addresses of the storage means;

a reading step of reading the data stored at a first address of said storage means, the first address being designated by said address management step;

an expanding step of expanding, using a single expander, the data of a n-th hierarchy having a first resolution read by said reading step into data of a (n+1)-th hierarchy having a second resolution, where n is an integer;

a storage control step of controlling said storage step to store the data expanded by said expanding step at a second address designated by said address management step, wherein the first address differs from the second address;

a control step of controlling said reading step, said expanding step, and said storage control step to repeat a series of operations comprising data reading, data expansion and data storage so as to generate image data expanded in m hierarchies from its original resolution, wherein m is an integer; and an output step of outputting the image data expanded a predetermined number of times by said expanding step and stored in said storage step.

* * * * *

UNITED STATES PATENT AND TRADEMARK OFFICE
CERTIFICATE OF CORRECTION

PATENT NO: 5,905,821

DATED : May 18, 1999

INVENTOR : HIROSHI NONOSHITA ET AL.      Page 1 of 2

It is certified that error appears in the above-identified patent and that said Letters Patent is hereby corrected as shown below:

ON TITLE PAGE: line 11 of item
 [57] ABSTRACT "circuits" should read --circuit--,.

Figure 22:
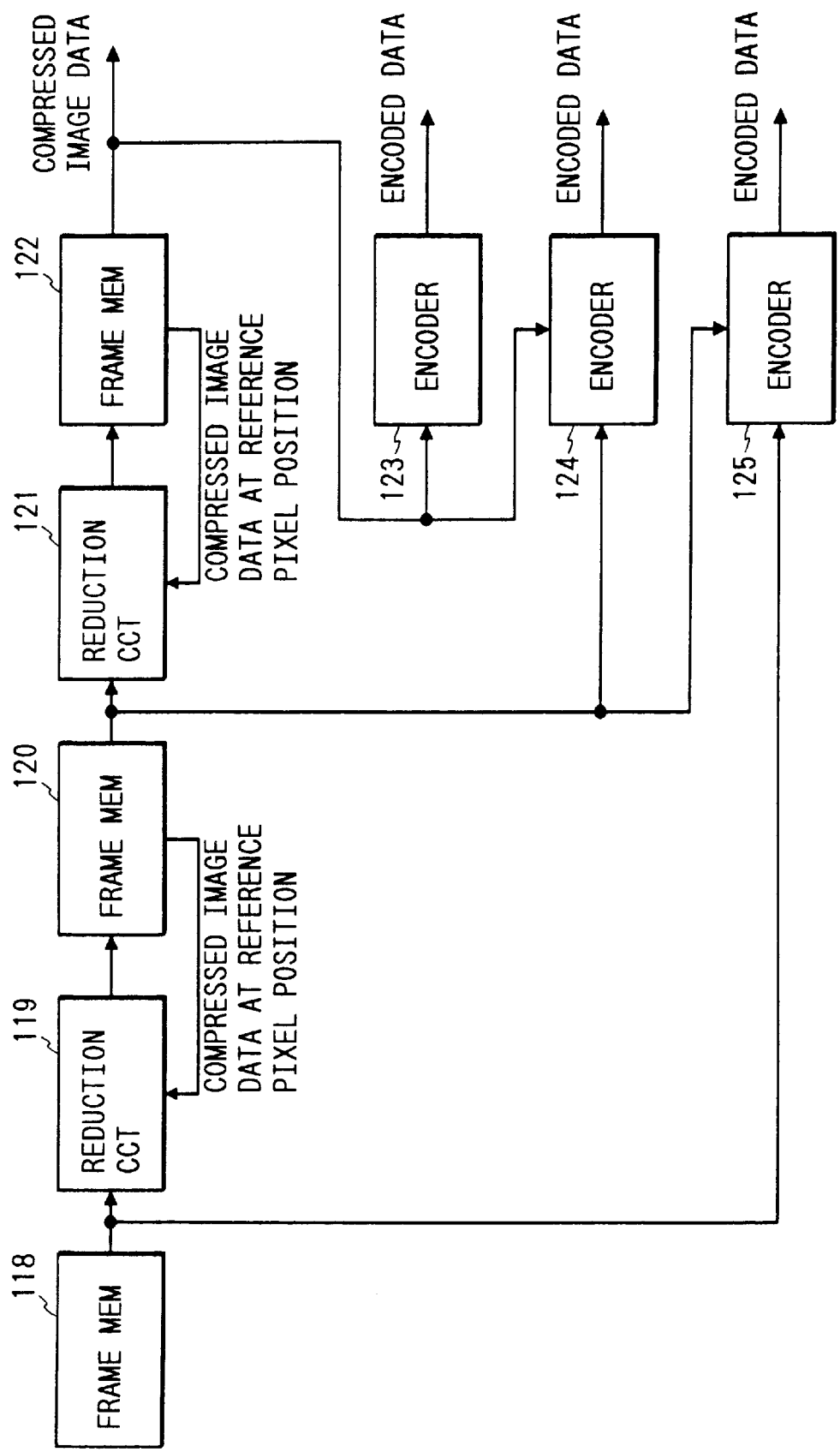
FIG. 22 is a block diagram showing a construction of a conventional circuit.

IN THE DRAWING:

Sheet 20 of 20 "FIG. 22" should be labeled
     --PRIOR ART--.

COLUMN 3 line 12, "compressing-process;" should read --compressing
     process;-- and
  line 37, "apparatus." should read --apparatus (not
     shown).--.

COLUMN 4 line 30, "via" should read --to--; "to" should read
     --via--; and "23" should read --23.--; and
  line 34, "use" should read --use of--.

UNITED STATES PATENT AND TRADEMARK OFFICE
CERTIFICATE OF CORRECTION

PATENT NO.    : 5,905,821

DATED         : May 18, 1999

INVENTOR(S) : HIROSHI NONOSHITA ET AL.

It is certified that error appears in the above-identified patent and that said Letters Patent is hereby corrected as shown below:

<u>COLUMN 5</u> line 11, "an" (first occurrence) should read --a--.

<u>COLUMN 9</u> line 24, "10" should read --10.--;
   line 45, "first" should be deleted; and
   line 46, "embodiment," should read --first embodiment,--.

Signed and Sealed this

Ninth Day of May, 2000

Attest:

Q. TODD DICKINSON

*Attesting Officer*            *Director of Patents and Trademarks*